United States Patent
Harjula et al.

(10) Patent No.: US 9,369,279 B2
(45) Date of Patent: Jun. 14, 2016

(54) HANDLING KEY ROTATION PROBLEMS

(71) Applicant: Venafi, Inc., Salt Lake City, UT (US)

(72) Inventors: Tero Petteri Harjula, Espoo (FI); Breon Malachy McCartney, Helsinki (FI); Asko Juha Saura, Helsinki (FI)

(73) Assignee: Venafi, Inc., Salt Lake City, UT (US)

( * ) Notice: Subject to any disclaimer, the term of this patent is extended or adjusted under 35 U.S.C. 154(b) by 110 days.

(21) Appl. No.: 14/034,091

(22) Filed: Sep. 23, 2013

(65) Prior Publication Data
US 2015/0086009 A1 Mar. 26, 2015

(51) Int. Cl.
*H04L 9/08* (2006.01)

(52) U.S. Cl.
CPC ............ *H04L 9/0894* (2013.01); *H04L 9/0825* (2013.01); *H04L 9/0861* (2013.01)

(58) Field of Classification Search
None
See application file for complete search history.

(56) References Cited

U.S. PATENT DOCUMENTS

| | | | |
|---|---|---|---|
| 7,607,164 B2 | 10/2009 | Vasishth et al. | |
| 8,116,456 B2 | 2/2012 | Thomas | |
| 8,213,620 B1 | 7/2012 | Sussland et al. | |
| 8,295,492 B2 | 10/2012 | Suarez et al. | |
| 8,498,417 B1 | 7/2013 | Harwood et al. | |
| 8,831,228 B1 | 9/2014 | Agrawal et al. | |
| 8,949,180 B1 * | 2/2015 | Natanzon et al. | 707/610 |
| 9,124,430 B2 | 9/2015 | Harjula et al. | |
| 2002/0111133 A1 | 8/2002 | Wittkotter | |
| 2003/0163701 A1 | 8/2003 | Ochi et al. | |
| 2004/0179691 A1 | 9/2004 | Hori et al. | |
| 2004/0218763 A1 | 11/2004 | Rose et al. | |
| 2005/0120203 A1 * | 6/2005 | Yeh et al. | 713/156 |
| 2006/0212716 A1 * | 9/2006 | Ruddle | 713/186 |
| 2006/0236096 A1 | 10/2006 | Pelton et al. | |
| 2006/0291664 A1 | 12/2006 | Suarez et al. | |
| 2008/0025514 A1 | 1/2008 | Coombs | |
| 2008/0123855 A1 | 5/2008 | Thomas | |

(Continued)

FOREIGN PATENT DOCUMENTS

| | | |
|---|---|---|
| WO | WO-2015042599 A1 | 3/2015 |
| WO | WO-2015042603 A1 | 3/2015 |
| WO | WO-2015042604 A1 | 3/2015 |

OTHER PUBLICATIONS

"U.S. Appl. No. 14/034,010, Non Final Office Action mailed May 1, 2015", 27 pgs.

(Continued)

*Primary Examiner* — David Le
(74) *Attorney, Agent, or Firm* — Schwegman Lundberg & Woessner, P.A.

(57) ABSTRACT

Example embodiments include centralized systems for managing cryptographic keys and trust relationships among systems. Embodiments may include a centralized key store and a centralized policy store. Key sets comprising public/private keys may be stored in or identified by key objects. Key objects within the key store may be organized into trust sets and policies may apply at any level within the key store. Policies may identify when to rotate key sets. When rotating key sets, a new public key and a new private key may be generated. The new public/private keys may be installed at locations where the old public/private keys reside. As the new public/private keys are installed, they may be tested. If problems with the new public/private keys occur, the new public/private keys may be rolled back to the old public/private keys for locations experiencing problems. Remedial action may then be taken to resolve the problems.

20 Claims, 9 Drawing Sheets

(56) References Cited

U.S. PATENT DOCUMENTS

| | | | |
|---|---|---|---|
| 2008/0232598 | A1 | 9/2008 | Vennelakanti et al. |
| 2009/0086977 | A1 | 4/2009 | Berggren |
| 2009/0092252 | A1 | 4/2009 | Noll et al. |
| 2009/0252330 | A1 | 10/2009 | Patnala et al. |
| 2011/0096929 | A1 | 4/2011 | Seleznev et al. |
| 2012/0204032 | A1 | 8/2012 | Wilkins et al. |
| 2013/0044882 | A1 | 2/2013 | Rich et al. |
| 2013/0054613 | A1 | 2/2013 | Bishop |
| 2013/0067213 | A1 | 3/2013 | Liu |
| 2013/0114812 | A1 | 5/2013 | Gidwani |
| 2013/0159699 | A1 | 6/2013 | Torkkel |
| 2014/0317409 | A1* | 10/2014 | Bartok et al. .............. 713/171 |
| 2015/0086018 | A1 | 3/2015 | Harjula et al. |
| 2015/0086020 | A1 | 3/2015 | Harjula et al. |

OTHER PUBLICATIONS

"U.S. Appl. No. 14/034,082, Notice of Allowance mailed Jun. 12, 2015", 9 pgs.

"U.S. Appl. No. 14/034,082, Response filed Mar. 27, 2015 to Non Final Office Action mailed Jan. 5, 2015", 18 pgs.

"U.S. Appl. No. 14/034,082, Non Final Office Action mailed Jan. 5, 2015", 14 pgs.

"International Application Serial No. PCT/US2014/057042, International Search Report mailed Dec. 30, 2014", 2 pgs.

"International Application Serial No. PCT/US2014/057042, Written Opinion mailed Dec. 30, 2014", 4 pgs.

"International Application Serial No. PCT/US2014/057052, International Search Report mailed Dec. 30, 2014", 2 pgs.

"International Application Serial No. PCT/US2014/057052, Written Opinion mailed Dec. 30, 2014", 5 pgs.

"International Application Serial No. PCT/US2014/057053, International Search Report mailed Dec. 29, 2014", 2 pgs.

"International Application Serial No. PCT/US2014/057053, Written Opinion mailed Dec. 29, 2014", 9 pgs.

Noor, A Rshad, "Securing the Core with an Enterprise Key Management Infrastructure (EKMI)", ACM, (Mar. 2008), 98-111.

"U.S. Appl. No. 14/034,010, Response filed Aug. 31, 2015 to Non Final Office Action mailed May 1, 2015", 33 pgs.

"International Application Serial No. PCT/US2014/057053, International Preliminary Report on Patentability mailed Oct. 13, 2015", 5 pgs.

"U.S. Appl. No. 14/034,010, Final Office Action mailed Nov. 20, 2015", 34 pgs.

"International Application Serial No. PCT/US2014/057042, International Preliminary Report on Patentability mailed Apr. 7, 2016", 6 pgs.

"International Application Serial No. PCT/US2014/057052, International Preliminary Report on Patentability mailed Apr. 7, 2016", 7 pgs.

"U.S. Appl. No. 14/034,257, Appeal Brief filed Apr. 22, 2016," 40 pgs.

"International Application Serial No. PCTIUS2014/057052, International Preliminary Report on Patentability mailed Apr. 7, 2016", 7 pgs.

* cited by examiner

US 9,369,279 B2

HANDLING KEY ROTATION PROBLEMS

TECHNICAL FIELD

This disclosure relates to discovery and management of keys used with secure protocols and systems. More particularly, the disclosure relates to discovery and management of keys and trust relationships in environments employing Secure Shell (SSH), Secure File Transfer Protocol (SFTP), Secure Copy (SCP) and other related protocols used in a variety of environments that may include such systems as Unix, Linux, and similar operating systems on both server and client computers, and on computer appliances including routers, switches, and firewalls.

BACKGROUND

SSH is a protocol that leverages public key cryptography to authenticate and secure access among computers in a computer network. SSH secures, among other things, Telnet-related operations. Telnet has traditionally been used for remote management of various systems such as Unix, Linux, and Unix-like computers, routers, switches, firewalls, and other appliances and systems running a variety of operating systems. It has also been used for automated connections between systems via scripting and batch processing. SSH secures Telnet connections by authenticating servers to which a user or system is connecting (ensuring they are not connecting to the wrong server), encrypting the connection to the server (so private data is not publicly viewable), and optionally authenticating the client using public key cryptography as an alternative to usernames and passwords.

File transfer protocol (FTP) has commonly been used along with Telnet to facilitate management and operation of such systems and is subject to the same security challenges. Consequently, protocols such as Secure FTP (SFTP) and Secure Copy (SCP) have been developed to be used alongside SSH and generally use the same public and private keys (Key Pairs) used for SSH for their security. References within this document to SSH also refer to SFTP and SCP.

SSH devices and systems may include SSH clients, SSH servers, and SSH-enabled computing appliances, entities, or virtual machines acting as SSH clients or SSH servers. Separate user accounts may also act as SSH devices.

DETAILED DESCRIPTION

Figure 1:
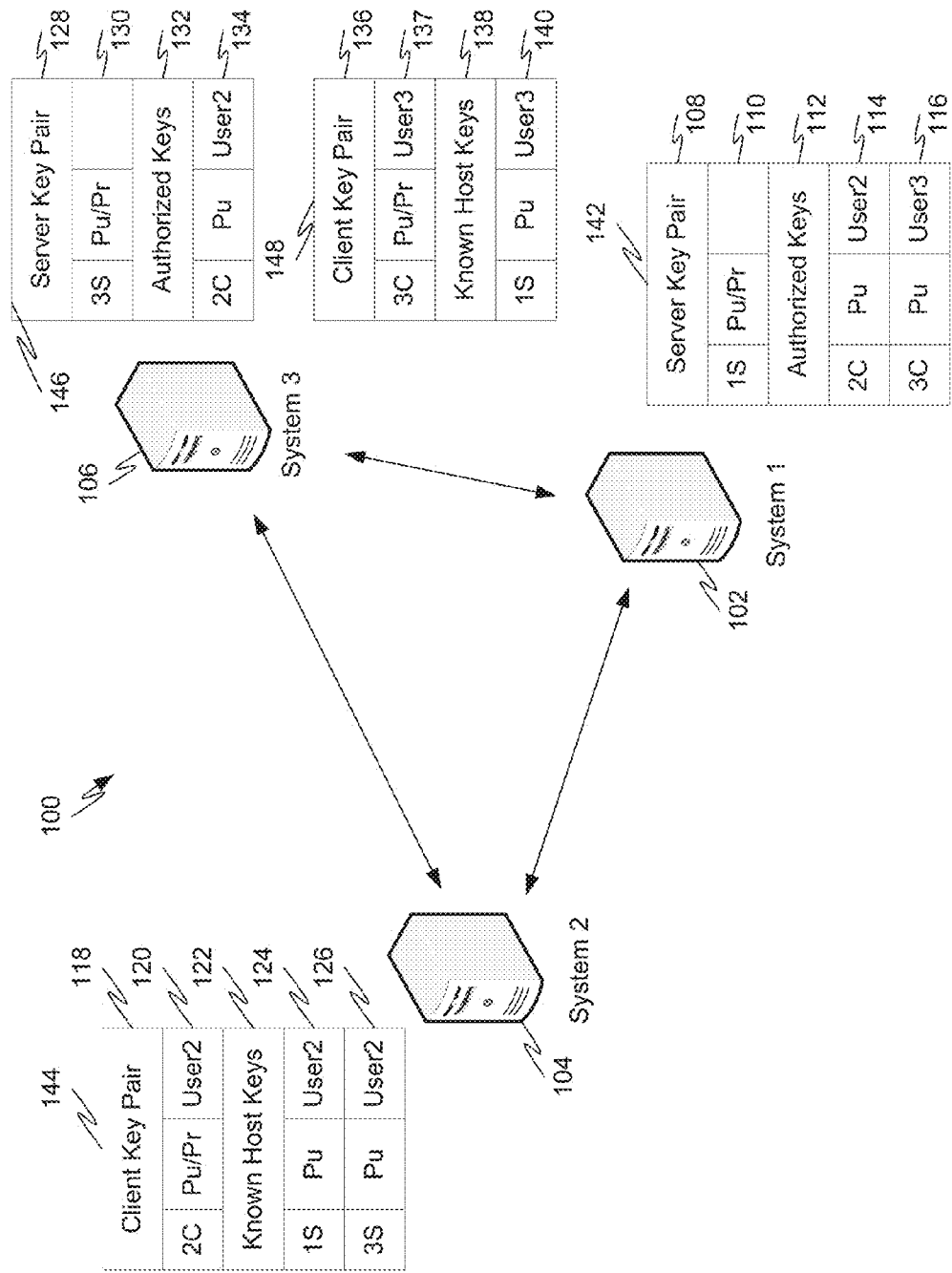
FIG. 1 illustrates storage of keys on server and client systems.

The description that follows includes illustrative systems, methods, techniques, instruction sequences, and computing machine program products of illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In the SSH protocol, there is a client (i.e., the system or user that initiates the connection) and a server (i.e., the system to which a connection is requested and made). In this disclosure client and user are often used interchangeably and no distinction is intended. A user/client may include a person or a service/machine account at the client system. Similarly server and host are often used interchangeably and no distinction is intended. In the simplest configuration, a key pair comprising a public key and a private key may be generated for an SSH server. The public key may be used by one or more SSH clients to authenticate the SSH server (e.g., the server may use its private key to encrypt, or sign, something which the public key may decrypt, or verify a signature, thus indicating to the SSH client the identity of the SSH server). The SSH clients may store the public key after the first connection with the SSH server, creating a trusted relationship between the SSH client and SSH server. The stored SSH server public key may be referred to as a "known host key." Optionally, a key pair can be generated for a client to authenticate the client to SSH servers using public key cryptography instead of usernames and passwords. The SSH servers to which the client connects may store its public key, creating a trusted relationship between the SSH server and client in which the stored key may be referred to as an "authorized key."

Because administrators who manage the systems that act as SSH servers and clients may individually generate key pairs and distribute or store the public keys used for authentication, these key pairs and public keys have proliferated broadly in organizations. This phenomenon has effectively created untracked trusted relationships and access between systems (and users).

SSH is often used in large network environments where thousands, tens of thousands or even more users, computers, and connected devices rely on it for secure authentication for mission-critical applications. The resulting number of public and private keys used for authentication grows geometrically with the expansion of the network environment. Moreover, computing networks are not static. Users and devices are added, removed, and changed on a regular basis; authentication rights of users and devices are also modified regularly to correlate with organizational changes. Security policies of the organization maintaining the network environment may also be altered. Key, security and/or key trust management may be difficult under such circumstances.

Challenges in using and managing SSH keys include, but are not limited to, the following.

(1) The variety of systems in a large network may mean that different systems have different "varieties" of SSH, each with differences in where keys are stored, the properties that may be associated with keys, whether keys may be protected where they are stored, and so forth. Centrally managing the different varieties of SSH with all their different implementations and capabilities may present numerous challenges.

(2) Collecting information on how keys are used at the various clients and servers where they reside may be difficult as only limited information tends to be available.

(3) SSH itself has no notion of a policy for keys and users can tamper with the keys and settings on the system, since they are not protected in a fashion that prevents tampering.

(4) There may be few restrictions on who can generate and add keys to systems, leading to more management challenges.

(5) When rotating keys (replacing "old" keys with "new" keys), various failures may occur and there is no mechanism for remedial action with current implementations of SSH.

In this disclosure, the following terms and definitions will be used.

Key pair (KP) means a public/private key combination where the public key may be used to decrypt information encrypted by the private key or verify signatures created by the private key and vice versa.

Key set (KS) means all instances of a particular mathematical key pair. The key set may be a user/client key set or a host/server key set.

Key set instance (KSI) means a single instance of a particular mathematical key. The key set instance may be a user/client key set instance or a host/server key set instance. Key set instance may be part of a key set, or a key set instance may be a singular occurrence of a mathematical key, the latter can be called an orphan key, OPK (other peoples keys), rogue key, unauthorized key and so forth.

Trust set (TS) means one or more key sets that are grouped together for management purposes.

User Trust (UT) means a trust relationship where it is established that a user private key is linked to the authorized public key on a server.

Host Trust (HT) means a trust relationship where it is established that the host public key is known by the client. This is often evidenced by way of having the host public key stored in client side user known host key file and/or global known host key file.

Key expiry means the date at which a key set expires or a time period for key validity (e.g., a length of time beginning at key provisioning/rotation during which the key will be valid). The key expiry often marks next action on key set such as rotate, whitelist, warn, blacklist, remove, and so forth.

Public key option means one or more options provided by a particular SSH implementation such as source control (e.g., allow and/or deny access from source to destination (host)), forced commands, and so forth.

Orphan key means that only one side of a key pair is found (e.g., private key without public key; public key without pairing private key).

Rogue key means an unrecognized user's key which could be an attacker's key, rogue user's key, and so forth.

Suspect key means an unrecognized orphan key that has not yet been categorized.

Unauthorized key means a user key not used according to authorized access policy.

Key rotation means replacement of key set with new key set.

Key provisioning means adding new UT or HT to a system.

Key removal means removing UT or HT from a system.

Managed system means a system that is either under management (e.g., has its keys managed by a central key management system) or is otherwise interacting with a centralized key management system (e.g., being brought under management, being searched for key or other information directly or indirectly by the centralized key management system, and so forth).

FIG. 1 illustrates a basic representative network 100 using SSH for authentication and security. In this network 100, systems store keys on server and client systems. Network 100 comprises system 102, which acts as a server. System 102 has block 142, which depicts all the keys stored and used on system 102. The keys illustrated in block 142 indicate that system 102 may operate as a server since it stores a server key pair 108. The server key pair 108 is a public/private key pair labeled 1S (meaning Sever 1). This is illustrated in FIG. 1 as server key pair 110.

In addition to its server key pair 110, system 102 knows several authorized keys, which may be stored in its authorized key file 112. These public keys are labeled 2C and 3C (meaning Client 2 and Client 3) and are associated with User2 and User3, respectively. Public key 2C is illustrated as 114 and public key 3C is illustrated as 116. Public key 114 indicates UT exists between Server 1 and Client 2 while public key 116 indicate UT exists between Server 1 and Client 3.

System 104 of FIG. 1 may operate as a client as indicated by the keys stored on system 104. The keys stored on system 104 are illustrated by block 144. System 104 has a client key pair 118. The client key pair 118 is labeled 2C (meaning Client 2) and comprises a public/private key pair associated with User2. This is illustrated in FIG. 1 as client key pair 120. As previously indicated, the public portion of key pair 120 is stored on system 102 as public key 114.

System 104 also knows several server public keys, which may be stored in known host key file 122. These public keys include server public key 1S (meaning Server 1) and server public key 3S (meaning Server 3), illustrated as public key 124 and public key 126, respectively. Public key 124 indicates HT exists between Client 2 and Server 1 and public key 126 indicates HT exists between Client 2 and Server 3.

System 106 may include both a server and a client as indicated by key block 146 and key block 148, respectively. Server key pair 128 includes the key pair for Server 3, as indicated by key pair 130. Sever 3 also knows the public key for Client 2 (associated with User2) as indicated by public key 134. Public key 134 may be stored in Server 3's authorized key file 132 as indicated. Public key 134 indicates UT exists between Server 3 and Client 2.

Key block 148 indicates system 106 may operate as Client 3 as indicated by client key pair 137. Client key pair 137 is associated with User3. Client 3 also knows about Server 1 as indicated by public key 140, which may be stored in known host key file 138. Public key 140 indicates HT exists between Client 3 and Server 1.

FIG. 1 is a simple example with a few servers and clients interacting. However, it serves the purpose of representing how keys and trust relationships may exist between systems. The systems of FIG. 1 may be physical, virtual, or some combination thereof. For example, on system 106, Server 3 may execute within one virtual machine and Client 3 may execute within a different virtual machine. Alternatively, both may execute on the same physical or virtual machine. In general, systems (physical or virtual) may operate as a server, as a client, or as both a server and a client at different times. As the number of servers and clients grows, the number of trust relationships and keys grow significantly, and the addition of a few more systems can significantly increase the complexity of managing keys. A typical installation may have hundreds, thousands, tens of thousands, or more such keys and/or relationships.

Figure 2:
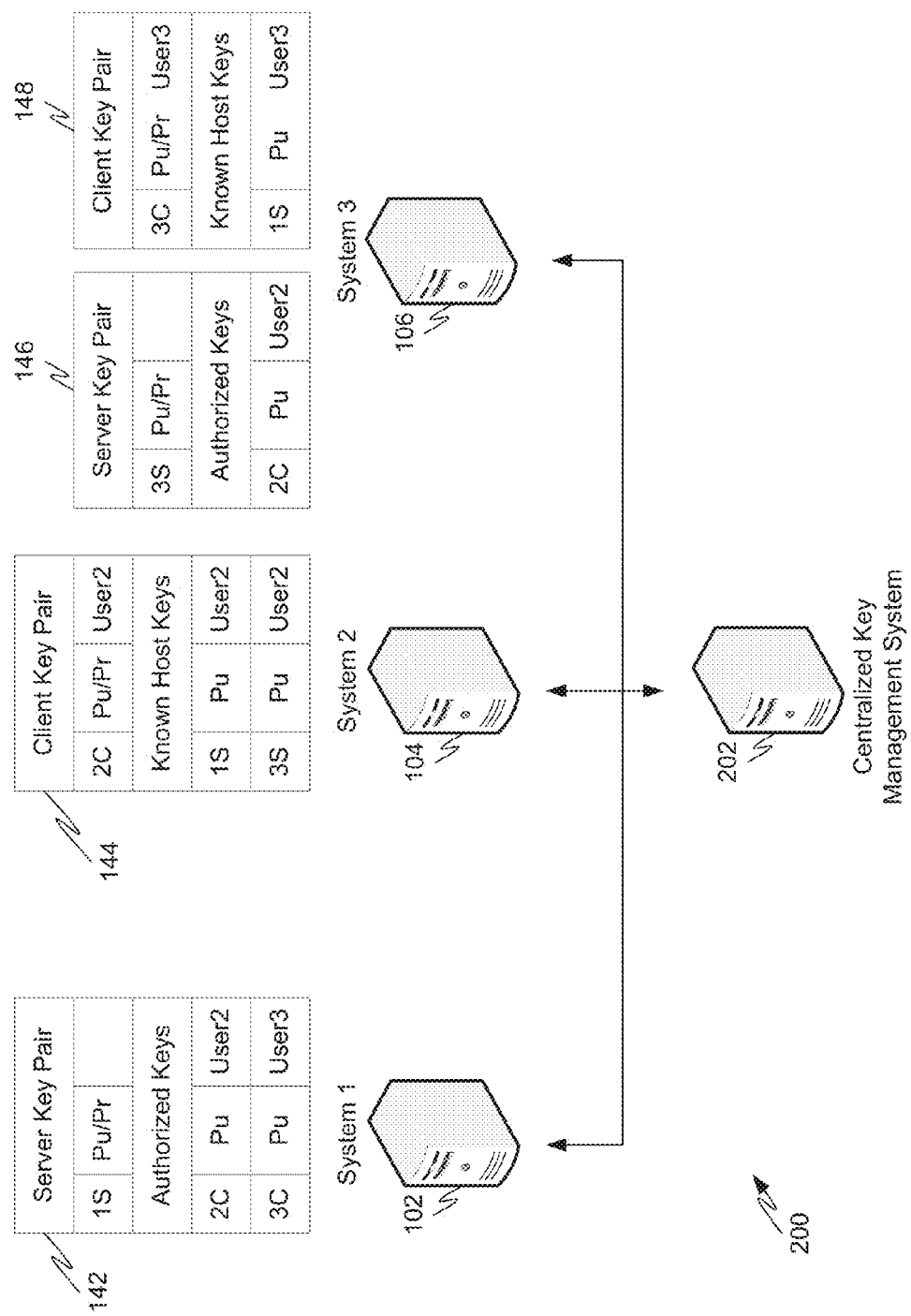
FIG. 2 illustrates a centralized key management system connected to server and client systems.

FIG. 2 illustrates a centralized key management system 202 connected to server and client systems. The server and client systems are the same as those illustrated in FIG. 1 for simplicity. Thus, system 102 has key block 142, system 104 has key block 144 and system 106 has key blocks 146 and 148, all as previously explained in conjunction with FIG. 1. These keys may be brought under management by a centralized key management system 202. Centralized key management system 202 may use various mechanisms, such as those described below, to discover key information. Thus, after full discovery, centralized key management system 202 may identify and in some embodiments store the discovered information in a central key store. Table 1 below represents basic information that may be discovered, and if desired, stored on centralized key management system 202. As explained below, additional information may also be discovered and retrieved in some embodiments.

TABLE 1

Basic Key Information

| Key | System Where Key Resides | Key Type | Associated Account | System Where Key is From (e.g. keypair) |
|---|---|---|---|---|
| 1S | System 1 | Server Key Pair | Server 1 | System 1 |
| 2C | System 1 | Authorized Key | User2 | System 2 |
| 3C | System 1 | Authorized Key | User3 | System 3 |
| 2C | System 2 | Client Key Pair | User2 | System 2 |
| 1S | System 2 | Known Host Key | User2 | System 1 |
| 3S | System 2 | Known Host Key | User2 | System 3 |
| 3S | System 3 | Server Key Pair | Server 3 | System 3 |
| 2C | System 3 | Authorized Key | User2 | System 2 |
| 3C | System 3 | Client Key Pair | User3 | System 3 |
| 1S | System 3 | Known Host Key | User3 | System 1 |

In addition to the above basic information, key information that may be discovered includes, but is not limited to:

(1) Key/Key pair
(2) Comments associated with the keys
(3) Link to the keys (e.g., where to find them)
(4) Know host files (e.g., server name+key)
(5) Authorized key files (e.g., client name+key)
(6) Key owner (e.g., the key holder/user)
(7) Key permissions.

Figure 3:
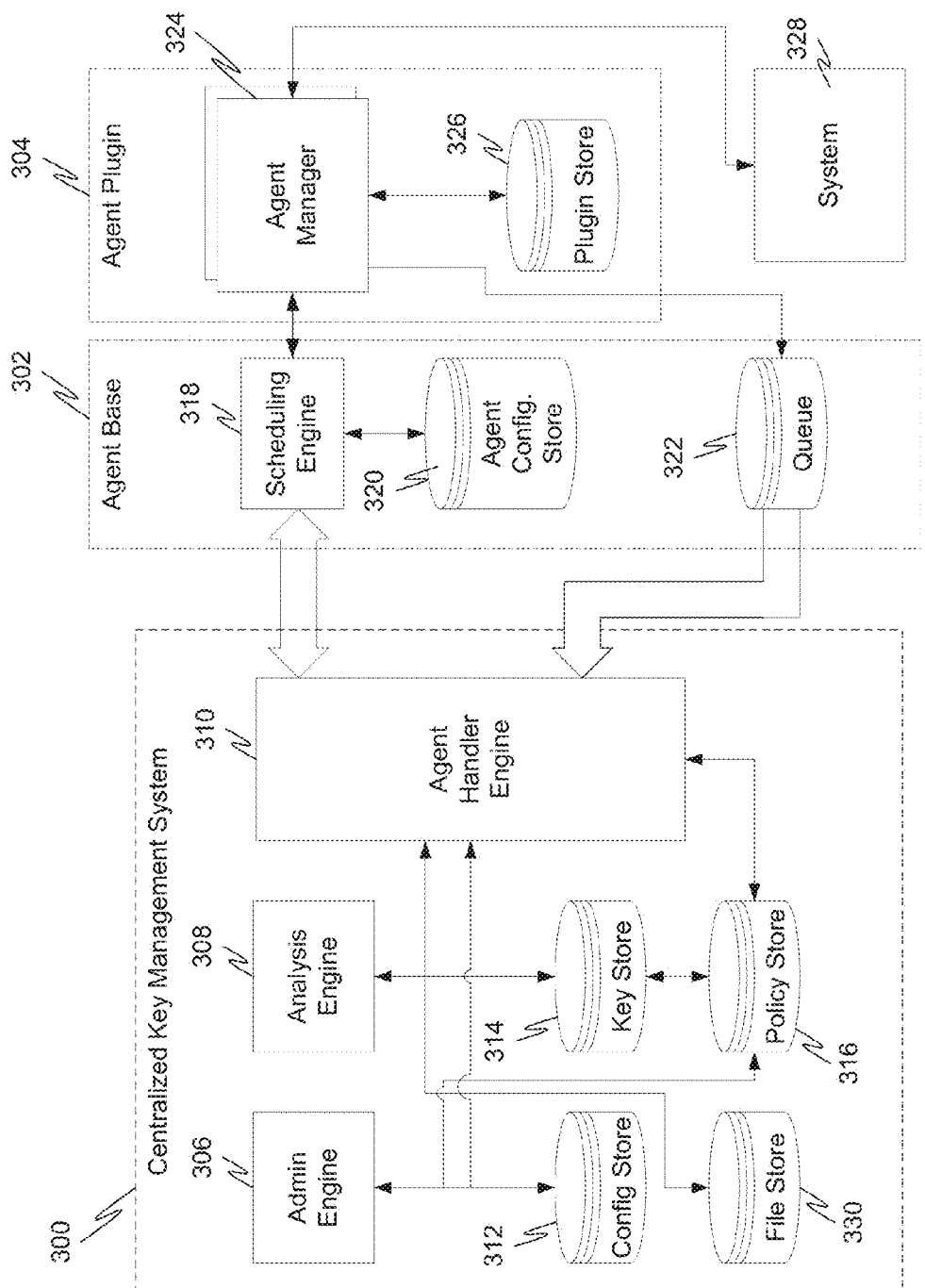
FIG. 3 illustrates a representative architecture to centrally manage keys with a centralized key management system and agents.

FIG. 3 illustrates a representative architecture to centrally manage keys with a centralized key management system and agents. The architecture comprises centralized key management system 300. Centralized key management system 300 may comprise administrative engine 306. Administrative engine 306 may perform various functions, such as interacting with users to obtain and/or display configuration information, key information, and/or policy information of centralized key management system 300. In one embodiment, users interacting with centralized key management system 300 may configure agents to perform various tasks in a centralized fashion. Configuration may include any operation of the agents, which is discussed below. Although the details are given below, general categories of agent configuration may include, but are not limited to:

(1) Schedules to perform various actions;
(2) Criteria used to search for key information;
(3) Tags associated with search criteria;
(4) State indicating actions to be taken when information is located according to the search criteria;
(5) Logging parameters to be applied (e.g., particular events/information to be gathered); and
(6) Various actions to be taken by the agent.

Systems may be grouped together for purposes of management, depending on various criteria. For example, a user may desire to configure systems having key sets belonging to a particular TS together. Thus, some combination of configuration parameters may be created and applied to the relevant systems at once. This may be implemented in different ways in different embodiments. In one embodiment, configuration parameters may be grouped together in a configuration object and the configuration object may be applied to systems at various levels. For example, perhaps a system has two different variants of SSH on the system or the user would like certain user or server accounts to be treated differently (e.g., perhaps they are part of different trust sets). The administrative engine 306 may allow a user to create different configurations for the variants of SSH or for the different trust sets and the configurations may be applied to the system at the level the user indicates (e.g., the particular SSH variant or the particular TS).

The administrative engine 306 also allows a user to configure policies and indicate how the policies may be applied. Details of policies are discussed below.

Centralized key management system 300 may also comprise analysis engine 308. Analysis engine 308 may perform various functions such as evaluating key store information, policy information, or other information such as logging information retrieved from various systems to detect and alert a user to conditions within the system 300. For example, policies and the key information may be evaluated to determine whether keys are compliant or non-compliant with appropriate policies. The analysis engine 308 may compare the key information with the policy requirements that apply to the key in order to detect out of policy conditions. As an example, consider a system where key information stored in key store 314 includes, among other things:

(1) Key/Key pair.
(2) Key/Key pair properties (e.g., key length, algorithm used to generate the keys, key/key pair format).
(3) Comments associated with keys.
(4) Key options.
(5) Key permissions.
(6) Key file access rights.
(7) Key locations (e.g., where to find them).
(8) Known host files (e.g., server name+key).
(9) Authorized key files (e.g., client name+key).
(10) Key owner.
(11) Key date (e.g., when the key was created, activated, and so forth).

Also consider that the policy that applies to the key includes, among other things:

(1) Key property requirements (e.g., allowed key length, algorithms allowed for key generation, key/key pair format, and so forth).
(2) Key option requirements (e.g., restrictions on the IP/hostname a key can be used from, usage restrictions, forced commands required, and so forth).
(3) Key permission requirements.
(4) Key file access rights requirements.
(5) Key locations requirements (e.g., where may they be stored).
(6) Key expiry.
(7) Whether key expiry is hard or soft (e.g., whether action should be taken immediately upon expiry or whether delays may occur. This may be used in conjunction with/as an alternative to the expiry grace period).
(8) Expiry grace period.
(9) Action at expiry (e.g., rotate, delete, do nothing, and so forth).

(10) Allow key rotation.

(11) Rollback period.

(12) Allow connection testing for rollback.

The analysis engine 308 may determine whether the key itself is in compliance with policy by comparing the key information with the policy information relevant to the key. The system 300 may also outline actions to be taken when an out of policy key/key set is discovered. The actions to be taken may depend on what exactly is out of policy. For example, if the key is expired, but the key expiry is soft with a grace period, the action to be taken may be notification of appropriate system administrators, management, and/or users. If the key set is expired, and outside of the grace period, then the action to be taken may be to automatically rotate the key and send notifications. As yet another example, perhaps the system 300 discovered that a new key was added to a managed system by an unauthorized user. The policy may specify that the unauthorized user is identified to appropriate system administrators, management, and/or users and the key is removed from the system 300. If a key is added by an authorized entity, but the key is simply too short or was generated using a non-approved method, the system 300 may send out appropriate notifications and initiate a key rotation to update the key and bring it within policy.

As may be seen from the above examples, the system architecture is flexible and numerous actions may be taken in a variety of combinations. Discussion of categories of representative actions is included below in conjunction with FIG. 7.

Analysis engine 308 may also produce a variety of reports about the state of the system 300 or about the data within the system 300. In one embodiment, reports may be produced that report on any of the information included in centralized key management system 300, including configuration information, key information, policy information, logged information, nested policy information for grouping (such as by geography, country, division, department and so forth), out-of-policy and other exceptions, and/or combinations thereof. Reports may be a formatted according to some given format or may simply be desired information displayed upon request (e.g., show me exceptions or other out-of-policy conditions).

Centralized key management system 300 may also include agent handler engine 310. Agent handler engine 310 is responsible for interaction with agents installed on systems. Thus information received from, or sent to, agents may be received via or sent via agent handler engine 310. For example, agents may request configuration information when a schedule time arrives or upon some event (such as agent startup). When agent handler engine 310 receives a configuration request, it may send the configuration to the requesting agent, along with any additional information it needs to send. Agent handler engine 310 may also push information to agents upon occurrence of a scheduled time or an event.

Agent configuration sent by agent handler engine 310 to agents may comprise such information as:

(1) Schedules for various activities performed by the agent such as retrieving configuration information from the centralized key management system 300, uploading search results, changes and/or other information the agent has collected to the centralized key management system 300, uploading events or log messages to the centralized key management system 300, when the agent may inquire from the centralized key management system 300 whether it has work for the agent, and so forth. In addition, specific activities may be specifically scheduled so that when a particular activity is assigned to an agent, a schedule based on time, an event, a combination of events, or any combination thereof may be set.

(2) Under certain circumstances, it may be useful for the agent to contact centralized key management system 300 at a time that does not conform to any particular schedule. The conditions under which the agent may initiate contact may be part of the configuration information sent to the agent. Examples of situations where an agent may not wait for a scheduled time to contact the centralized key management system 300 are discussed below. Alternatively, or additionally, the agent may provide a set of configurable options that may be set by the centralized key management system 300.

(3) Search criteria that may be used to locate key information. The search criteria may include conditions derived from the key or key files, one or more tags that may be associated information located by the search, and state information indicating actions that may be performed on located information. Conditions derived from the key or key files may be any combination of information that would help locate the desired information. Examples include, but are not limited to, text to match in the key file, a file name of the key file, a file hash of the key file, a byte stream to match in the key file, a property indicating ownership of the key file, a permission assigned to the key file, metadata assigned to the key file, locations within the directory structure of the system 300 to search, and/or combinations thereof. Rich combinations of positive and negative conditions may be put together (e.g., match this string, but not that one, and search in this location, but not that one, etc.). Tags may help the system 300 to identify the type of information that is located. Tags may also help in later processing such as when the information may be sent to a parser without having to recheck what sort of information it is prior to sending it to the parser. State information may be used to indicate actions that may be taken with respect to the located information, such as "waiting to send" the information to the centralized key management system 300 to indicate that the information may be sent at the next opportunity, or "sent," indicating no further action need be taken for now, or "deleted," indicating the information has been deleted from the system 300, "parse" indicating the information should be reformatted and so forth.

(4) Information indicating file or registry operations to be performed by the agent. File operations may include such activities as adding a file, deleting a file, adding a directory, deleting a directory, changing permissions (e.g., on a file, directory, and so forth), retrieving a file, replacing a file, and so forth. Registry operations may include adding a registry entry, deleting a registry entry, replacing a registry entry, and so forth. When a file or registry operation is indicated, the agent handler engine 310 may include information to be acted upon (e.g., the file that may be added) or may include information allowing such information to be located (e.g., retrieve logging information matching this criteria and send it to the centralized key management system 300) and/or combinations thereof (e.g., replace the file matching this criteria on the centralized key management system 300 with the attached file). Through file and/or registry operations, the centralized key management system 300 may be configured as a user desires (e.g., in accordance with a designated policy, configuration profile, etc.). Thus, centralized configuration of not only the agents, but also the systems themselves, may be accomplished.

Centralized key management system 300 may also comprise a variety of stores (e.g., locations where information is stored). In the embodiment of FIG. 3, centralized key management system 300 comprises configuration store 312, key store 314, policy store 316 and file store 330. They are broken out in the embodiment of FIG. 3 for clarity in discussion. The various stores need not be separate, but may reside in one or a combination of stores.

Configuration store 312 may comprise configuration information as discussed above. Key store 314 comprises key information, and policy store 316 comprises policy information, examples of which are discussed below in conjunction with FIG. 6. File store 330 may store any information sent by (or to) agents that does not fit within the above categories. For example, as discussed above, agents may be configured to retrieve and send to the centralized key management system 300 logging information or events that identify how keys are used on a particular system. This logging and/or event information may be stored in file store 330 for evaluation or reporting as previously described. Some or all of these stores may be encrypted or portions of a store may be encrypted in order to preserve the privacy of some or all of the information in a given store.

The architecture of FIG. 3 may also include agents that comprise an agent base 302 and one or more agent plugins 304. Dividing the agent into a base 302 and plugin 304 provides a great deal of flexibility and reusability in the agents. Agent base 302 may comprise the functionality common to all plugins 304 such as managing schedules, configuration, communication with centralized key management system 300, and so forth. The plugin 304 may be tailored to specific protocols or protocol variants. For example, the details of how to interact with a particular system (e.g., protocol variant, operating system variant, virtual machine variant, hardware variant, and so forth) may be encapsulated into the plugin 304. If support for a new protocol or a new variant of SSH is desired, a new plugin encapsulating those differences may need to be added to the agent. In some situations and/or embodiments, it may not be necessary to include a new plugin to support new protocols or new variants. For example, if a new protocol or variant differs from a current protocol in areas that are reconfigurable (e.g., differences are covered in the various possible configuration options that the centralized key management system may send to an agent), then the centralized key management system need only send updated (additional and/or alternative) configuration information to support the new protocol variant. Thus, a new SSH variant that had different storage locations and formats for key/key sets/key files, may be supported by modifying the appropriate configuration options. In this way, a wide variety of protocols and system variations may be handled in an extensible fashion.

The agent base 302 may comprise an assignment and scheduling engine 318. In general, the assignment and scheduling engine 318 is responsible for communicating with the centralized key management system 300 and for making assignments according to the proper schedules and conditions to the appropriate agent plugins 304. Communications may be initiated by the agent base 302 or may be initiated by the centralized key management system 300. Such communication may be secured, for example, using Transport Layer Security (TLS) or some other security protocol. Communications may include, for example, communications from the centralized key management system 300 such as configuration information (schedules, non-scheduled communications, search criteria, file operations, registry operations, and so forth as discussed above). Received configuration information may be stored by the agent, as illustrated by agent configuration store 320. Agent configuration store 320 may be implemented in any desired fashion as long as the desired information may be stored and retrieved when needed.

Communications may also include, for example, communications from the agent to the centralized key management system 300 such as requests for configuration information or information that is sent to the centralized key management system 300 either on a scheduled basis or due to the occurrence of some event or set of events. Information sent to the centralized key management system 300 either on a scheduled basis or due to the occurrence of some event or set of events may include, for example, results of search criteria, key usage and other logged event information, results of file operations, results of registry operations, and so forth.

In some embodiments, some communications from the agent to the centralized key management system 300 may not go through the assignment and scheduling engine 318. This may include, for example, items that have been queued up for communication to the centralized key management system 300 at the next scheduled "phone home" opportunity. These queued up communications are indicated in FIG. 3 by queue 322. Queue 322 represents a mechanism that the agent may use to send desired information to the centralized key management system 300 either at a scheduled time, or due to the occurrence of some event or sequence of events that causes a non-scheduled communication.

As previously discussed, schedules for various activities may include retrieving configuration information from the centralized key management system 300, uploading search results and/or other information the agent has collected to the centralized key management system 300, uploading events or log messages to the centralized key management system 300, when the agent may inquire from the centralized key management system 300 whether it has work for the agent the agent may do, and so forth.

Under certain circumstances, it may be useful for the agent to contact centralized key management system 300 at a time that does not conform to any particular schedule. The conditions under which the agent may initiate contact may be part of the configuration information sent to the agent. Examples of conditions when it may be useful for the agent to contact the centralized key management system 300 at a non-scheduled time may include conditions under which the agent may need to enforce a managed KS and/or managed configuration. For example, if the agent detects an unauthorized change at the host (e.g., detecting a changed hash, detecting changed data directly, and so forth), the agent may contact the centralized key management system 300, retrieve the authorized KS and/or configuration and replace the information on the host system to enforce desired policies.

Agent plugin 304 may comprise an agent manager 324 and a plugin store 326. The agent manager 324 is responsible for receiving information and assignments from the assignment and scheduling engine 318 in order to fulfill requests made by the centralized key management system 300. Such assignments may include executing searches on the centralized key management system 300 according to search criteria, performing file operations, performing registry operations, gathering key usage events or other logged information, and so forth. Assignments received from the assignment and scheduling engine 318 and information associated with the assignments may be stored in plugin store 326. Results and gathered information may also be stored in plugin store 326. Agent plugin 304 may place information to be communicated back to the centralized key management system 300 in queue 322.

In the embodiment of FIG. 3, system 328 represents the interactions that agent manager 324 has with the system on which it resides. Thus, it represents the mechanisms used by agent manager 324 to accomplish the assignments it has. For example, when the agent manager 324 performs a search according to search criteria, it may interact with the centralized key management system 300 to search the file system and other locations (if specified) according to the search criteria for the desired information. If the agent is assigned to perform file operations or registry operations, agent manager 324 may use system calls or other mechanisms to carry out the desired file or registry operations. Similar mechanisms may be used to perform other assignments like gathering key use events or logging information to send back to the centralized key management system 300.

Although the architecture in FIG. 3 shows an agent broken into an agent base 302 and an agent plugin 304, alternative embodiments may integrate these two portions into a unified whole (e.g., a more monolithic architecture).

Figure 4:
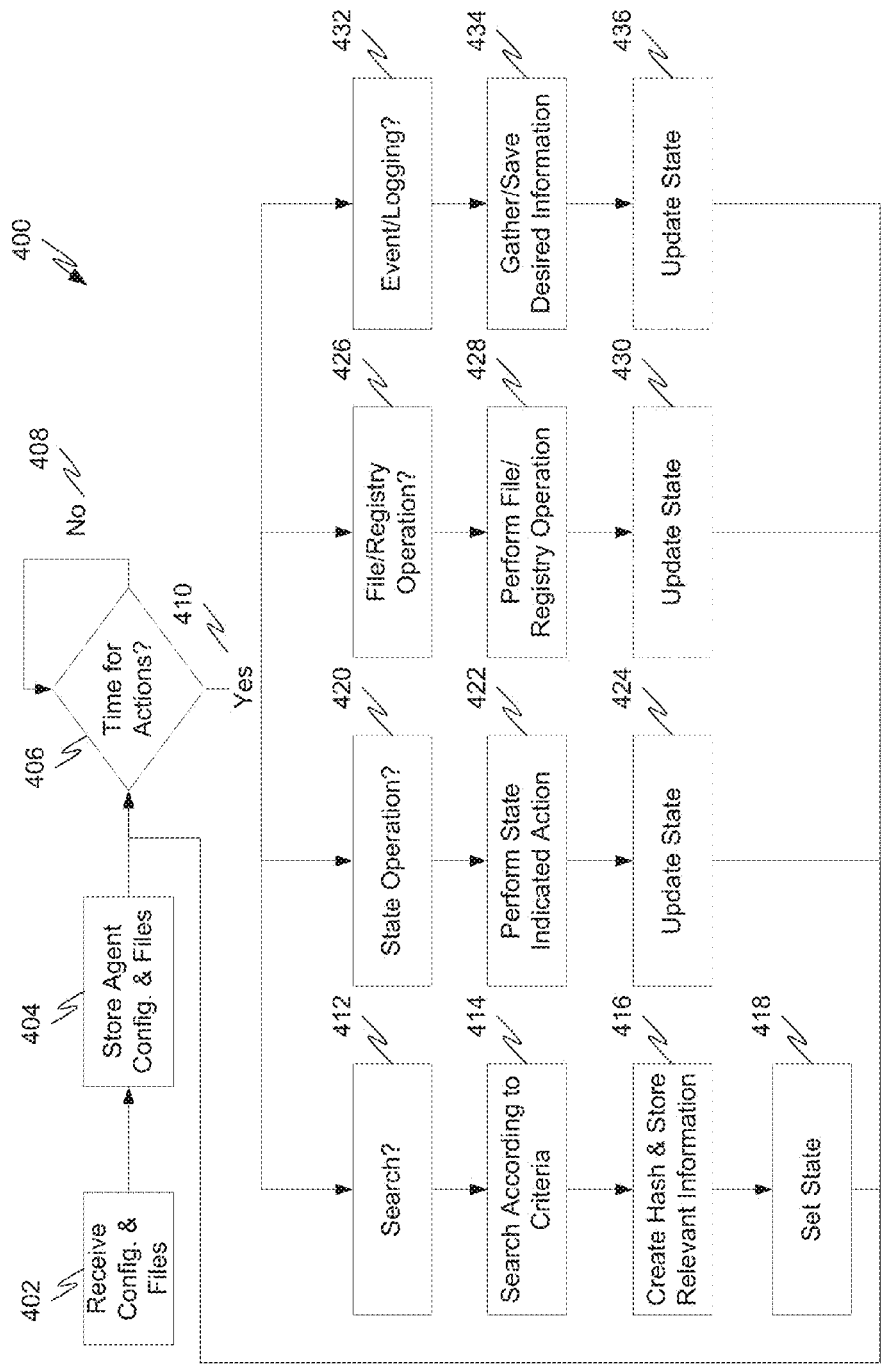
FIG. 4 illustrates a representative flow diagram for an agent on a managed system.

FIG. 4 illustrates a representative flow diagram 400 for an agent on a managed system. Such a flow diagram 400 may be implemented, for example, using the agent architecture outlined in FIG. 3 or the more monolithic agent architecture described above.

The method beings at operation 402 where the agent receives configuration information and any associated information. This information may be received as a result of the agent requesting it from the centralized key management system (e.g., centralized key management system 300) or as a result of the centralized key management system pushing the data to the agent. As previously discussed, the configuration information may comprise schedules for various activities, conditions under which the agent may contact the centralized key management system at a time that does not conform to a schedule, search criteria to locate and process information on the system where the agent resides, file operations, registry operations, and so forth.

The received information is stored in operation 404. The information may be stored in any location available to the agent. One example would be a store such as the configuration store 320 of FIG. 3. Other examples also exist, and the exact location is unimportant as long as the information is available for later retrieval.

In operation 406, the agent waits for the appropriate time for an action to occur. This is indicated by the "no" branch 408. Time for an action may occur because a scheduled time has arrived. The centralized key management system may set schedules for various activates to be performed by the agent such as retrieving configuration information from the centralized key management system, uploading search results and/or other information the agent has collected to the centralized key management system, uploading events or log messages to the centralized key management system, determining when the agent may inquire from the centralized key management system whether it has work for the agent, and so forth.

Time for an action may also occur because a particular event or combination of events has occurred. As an example, the agent may be configured to request configuration information from the centralized key management system upon agent startup. As another example, the agent may be configured to detect and send information about a potential security breach immediately, rather than wait for some scheduled "phone home" time to occur. As yet a further example, the agent may be configured to capture key usage events as they occur rather than rely on log information.

When the time for action occurs as indicated by the "yes" branch 410, then the agent takes appropriate action in accordance with the triggering event/time. The parallel branches of FIG. 4 represent examples of actions that may be performed by the agent. Note that although the branches are shown as parallel, they may not be mutually exclusive. In some embodiments, agents may be configured to perform different actions in parallel. In other embodiments, the agent may perform one action (say search) and then immediately afterward perform another operation (say logging the fact of the search or some other processing of the search data). This is shown by the loop back from the parallel activity branches back to operation 406, which will appropriately trigger further actions based on time/events, including the event of just having finished one action that may then be followed by another.

One activity that may be performed by the agent is searching for information matching search criteria. This is indicated by search operation 412. The search criteria may include conditions derived from a key or key files, one or more tags that may be associated information located by the search, and state information indicating actions that may be performed on located information. Conditions derived from the key or key files may be any combination of information that would help locate the desired information. Examples include, but are not limited to, text to match in the key file, a file name of the key file, a file hash of the key file, a byte stream to match in the key file, a property indicating ownership of the key file, a permission assigned the key file, metadata assigned to the key file, locations within the directory structure of the system to search, and/or combinations thereof. Rich combinations of positive and negative conditions may be put together (e.g., match this string, but not that one, and search in this location, but not that one, etc.). Tags may help the system identify the type of information that is located. Tags may also help in later processing such as when the information may be sent to a parser without having to recheck what sort of information it is prior to sending it to the parser. State information may be used to indicate actions that may be taken with respect to the located information, such as "waiting to send" the information to the centralized key management system to indicate that the information may be sent at the next opportunity, or "sent," indicating no further action need be taken for now, or "delete," indicating the information has been deleted from the system, and so forth.

Operation 414 indicates the search is performed according to the criteria to locate the information specified by the criteria. If information is located, the located information may be stored along with other, related information as indicated in operation 416. In addition, mechanisms may be used to identify whether the information on the system has changed to avoid re-searching the same information using the same criteria only to arrive at the same result. As one example, the search criteria may be set to locate keys on the system, including any key pairs as well as the authorized key file or known host key file. When the agent locates the information, the agent may take a hash across the information (so that the agent may identify changes in the information) and the information, along with the hash as well as related metadata, may be stored. Such metadata may include permissions on the files containing the located information, location where they are stored, owners of the files, size of the files, create/update date of the files, and so forth. As part of operation 416, the agent may also assign the appropriate tag to the information as specified in the search criteria. One or more tags may be included in the search criteria for assignment to located information.

After the information is located and stored, a state may be set in conjunction with the stored information as indicated in operation 418. The state information may be used to indicate what further processing may happen to the stored information. For example, one state may indicate that the information is waiting to be sent to the centralized key management system. Other states may include "rotation started" to indicate that key rotation for a particular KS has begun, "file/registry operation completed" indicating a file or registry operation (as the case may be) has been completed, "unauthorized change detected" indicating an unauthorized change has been detected, "parse" indicating reformatting of relevant information in the located information (e.g., the modulus and exponent from an RSA public key), and so forth.

After operation 418, the flow transfers back to operation 406 so that further action may be taken at the appropriate time or upon occurrence of the appropriate event or combination of events.

Information stored on the agent may have states assigned that indicate that further processing may occur. One example is the state discussed above indicating that the information is waiting to be sent to the centralized key management system. When events/time occur to indicate that the action indicated by a state may be taken, the agent may perform the indicated action. Operation 420 illustrates the branch taken when the agent performs actions indicated by a particular state.

In operation 422 the indicated action is performed. As an example, when the next "phone home" time occurs, or when the agent determines that it has information that may be sent to the centralized key management system and that it may not wait until the next scheduled time (assuming such a time exists), the agent may initiate transfer of the unsent information as part of operation 422. This may be implemented, for example, using the queue 322 illustrated in FIG. 3. The agent may place all (or a portion of) unsent data in the queue and send it at the appropriate time. Alternatively, the agent may parse through its storage area and send data with a "waiting to send" state. Other actions associated with states discussed above may also be performed.

Once the designated action(s) is performed, the state may be updated as indicated in operation 424. For example, in the case of data sent to the centralized key management server, the state may be set to "data sent." States may be paired or unpaired. For example, "waiting for upload" paired with "uploaded," "waiting for parsing" paired with "parsed," "file has been removed" not paired with another state, and so forth. Not all states that may be paired are paired in all embodiments. In some embodiments a single state (such as "waiting for upload") may be sufficient with the other possible paired state (such as "uploaded") either unimportant or not needed depending on the particular implementation. Then after receipt of an acknowledgement that the data has been appropriately received by the centralized key management system, the state operation 420 may be entered again, and some further action like removing the data may be performed. In this case, the data may be removed while keeping the hash and other information that allows the agent to detect changes in the data on the managed system if desired.

As previously discussed, the agent may be assigned to perform a file or registry operation 426. The processing accompanying this assignment is indicated by operation 426. File operations may include such activities as adding a file, deleting a file, adding a directory, deleting a directory, changing permissions (e.g., on a file, directory, and so forth), retrieving a file, replacing a file, and so forth. Registry operations may include adding registry entry, deleting registry entry, replacing registry entry, and so forth. When a file or registry operation is indicated, additional information to be acted upon may accompany the assigned operation. This information may include specific information to be acted upon (e.g., the file that may be added) or may include information allowing such information to be located (e.g., retrieve logging information matching this criteria and send it to the centralized key management system) and/or combinations thereof (e.g., replace the file matching this criteria on the managed system with the attached file). Operation 428 indicates the operation actually performed.

Finally, operation 430 indicates that any state information may be updated, if desired. For file/registry operations, state may be associated with the operation that indicates whether the operation is complete or not. Thus, prior to the file/registry operation being performed (e.g., prior to operation 428), a file/registry operation may have the state of "pending" or other state to indicate an uncompleted operation. After the operation is performed (e.g., after operation 428), the state may be set to "completed" if successfully completed or "error" if there was an error in completing the operation. The status of the operation may then be communicated back to the centralized key management system, using, for example, the branch of operation 420 which may associate the action of "tell the centralized key management system" with the state of "completed" or "error" when it comes to file/registry operations. In addition to communication of a simple status, the state may trigger transfer of more robust information such as what error occurred when the file/registry operation was attempted, or other related information.

Through file and/or registry operations, the managed system may be configured as a user desires (e.g., in accordance with a designated policy, configuration profile, etc.). In other words, the embodiments of the centralized key management systems may include centralized policy enforcement. For example, suppose a policy specifies that a particular system under management may have particular key options set such as restrictions on which IP locations may be used to log in to a particular system. As explained in conjunction with FIG. 6, such a policy may apply to a particular level within the key store such as a TS. However, users with sufficient permissions may be able to alter the key options and remove the IP location restrictions. The centralized key management system may use the policy to configure the agents running on systems where keys of the TS reside to check for out-of-policy conditions (such as a changed IP location restriction). The agent may be configured to detect a change in the key option and report back to the centralized key management system, which can then take appropriate action, such as report the change to the appropriate users/managers/administrators, log the change, instruct the agent to change the key option back to the desired values, etc. Alternatively, or additionally, the agent may be configured to ensure the key option always complies with the policy, and when a change is detected, to change it back to its desired value and report the changes to the centralized key management system.

Another example of actions that may be assigned to an agent is to collect information about events or logs that relate to key usage or other information relevant to key management. This can be particularly helpful in identifying how keys are used in managed systems and to identify usage patterns that are not in keeping with policy. Operation 432 illustrates such an event/logging branch. Operation 434 illustrates the agent capturing or otherwise gathering the desired information about the event(s) and/or logs. Again, once the information is gathered, a state may be associated with the information that indicates the data is waiting to be sent to the centralized key management system. Operation 436 illustrates this optional function.

Agents may have other assigned functionality not specifically illustrated in FIG. 4, and the branches of FIG. 4 are not meant to indicate that all embodiments have only these functions or that all embodiments implement all of these functions. Different embodiments may have either more or fewer functions than those illustrated in FIG. 4.

Figure 5:
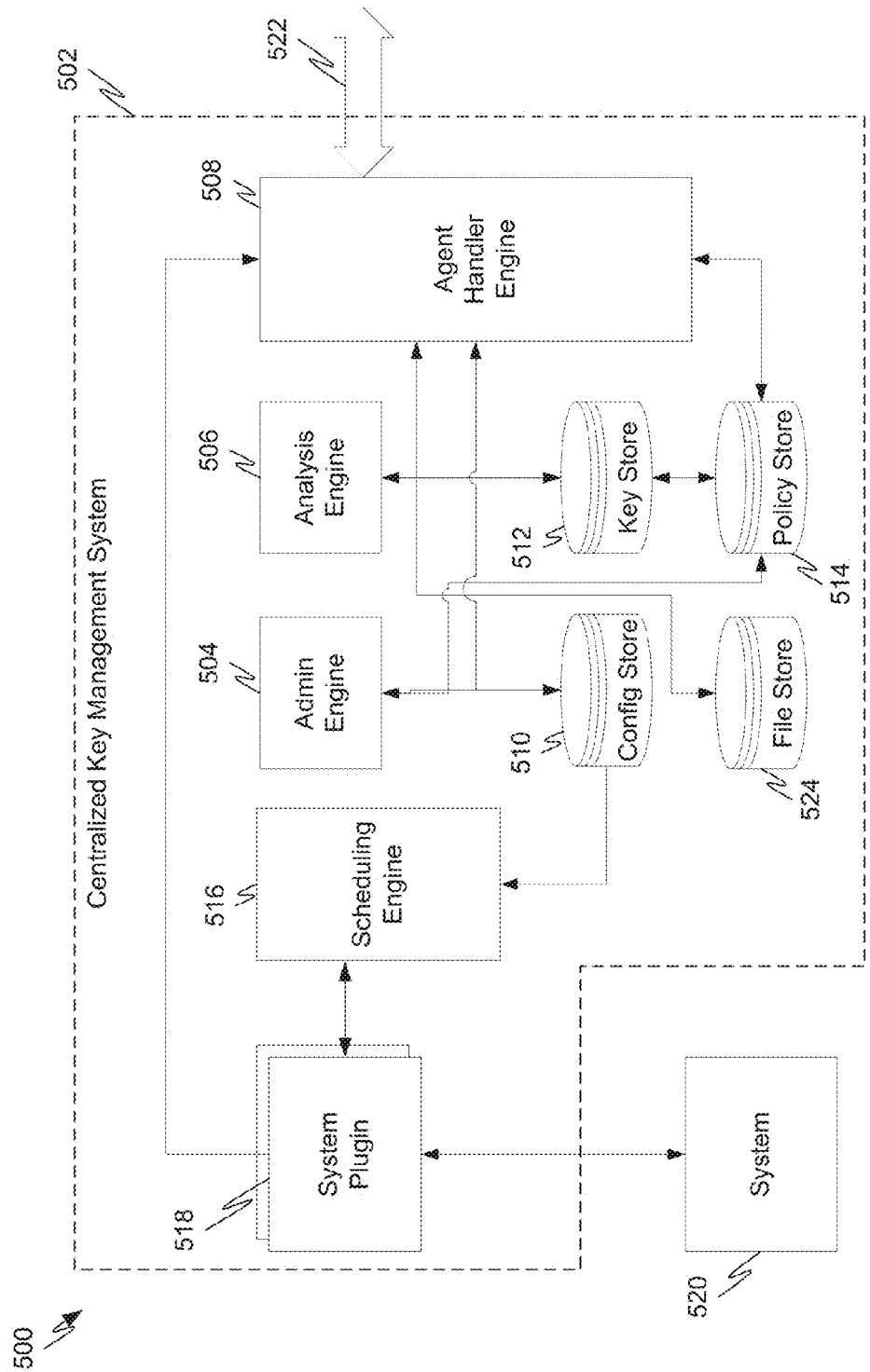
FIG. 5 illustrates a representative architecture to centrally manage keys with a centralized key management system.

FIG. 5 illustrates a representative architecture 500 to centrally manage keys with a centralized key management system 502. In architecture 500, agents are not used and the functionality of the agents may be incorporated into centralized key management system 502. Architecture 500 may function effectively like the architecture of FIG. 3, but rather than assign functions to agents, the centralized key management system 502 interacts directly with systems 520, performing the indicated operations via remote access. In addition to interacting directly with systems 520, the architecture 500 may also interact with agents, like those illustrated in FIG. 3, as indicated by arrow 522.

The centralized key management system 502 may comprise administrative engine 504. Administrative engine 504 may function like administrative engine 306 of FIG. 3. Thus administrative engine 504 may perform various functions such as interacting with users to obtain and/or display configuration information, key information, and/or policy information of centralized key management system 502. In one embodiment, users interacting with centralized key management system 502 may configure the systems 520 (e.g., directly or via agents as indicated by arrow 522) in a centralized fashion. Sufficient configuration details and examples have been discussed extensively above in conjunction with FIG. 3 and FIG. 4 and need not be repeated here. The administrative engine 504 also allows a user to configure policies and indicate how the policies may be applied as discussed above and below.

The centralized key management system 502 may also comprise analysis engine 506. Analysis engine 506 may function like analysis engine 308 of FIG. 3 and may perform various functions such as evaluating key store information, policy information, or other information such as logging information retrieved from various systems to detect and alert a user to conditions within the system 502. Any of the functionality and examples as previously described in conjunction with analysis engine 308 may also apply to analysis engine 506.

Analysis engine 506 may also produce a variety of reports about the state of the system 502 or about the data within the system 502 as previously described in conjunction with the analysis engine 308 of FIG. 3.

The centralized key management system 502 may also include agent handler engine 508. The agent handler engine 508 operates similarly to agent handler engine 310 of FIG. 3, and all the description in conjunction with the agent handler engine 310 applies to agent handler engine 508. Thus, the agent handler engine 508 is responsible for interaction with agents installed on systems (e.g., via arrow 522). In addition, agent handler engine 508 also interacts with the agent functionality incorporated into the centralized key management system 502 (such as assignment and scheduling engine 516 and/or system plugins 518). The agent handler engine 508 therefore sends and receives information to agents (e.g., via arrow 522) as well as to system plugins 518.

The centralized key management system 502 may also comprise a variety of stores (e.g., locations where information is stored). In the embodiment of FIG. 5, the centralized key management system 502 comprises configuration store 510, key store 512, policy store 514 and file store 524. They are broken out in the embodiment of FIG. 5 for clarity in discussion. The various stores need not be separate, but may reside in one or a combination of stores. Configuration store 510, key store 512, policy store 514 and file store 524 operate like configuration store 312, key store 314, policy store 316 and file store 330 of FIG. 3, respectively and the descriptions need not be repeated here.

Functionality that is incorporated into an agent in the architecture of FIG. 3, but which may be incorporated directly into the centralized key management system 502 of FIG. 5, includes assignment and scheduling engine 516 and system plugins 518. The assignment and scheduling engine 516 may operate like the assignment and scheduling engine 318 of FIG. 3. Thus, the assignment and scheduling engine 516 may be responsible for making assignments to the appropriate system plugins 518 according to the proper schedules and conditions.

As discussed in conjunction with the architecture of FIG. 3, plugins may be used with the architecture of FIG. 5 to add functionality to the centralized key management system 502 in an extensible and flexible way. Thus system plugins 518 may be developed that contain the mechanisms to perform the actions remotely for systems 520. In the architecture of FIG. 5, system plugins 518 are responsible for actually interacting with systems 520 and carrying out the actions previously described above that agents might perform. Thus, together assignment and scheduling engine 516 and system plugins 518 may perform the functionality described, for example, in conjunction with the flow diagram of FIG. 4.

Figure 6:
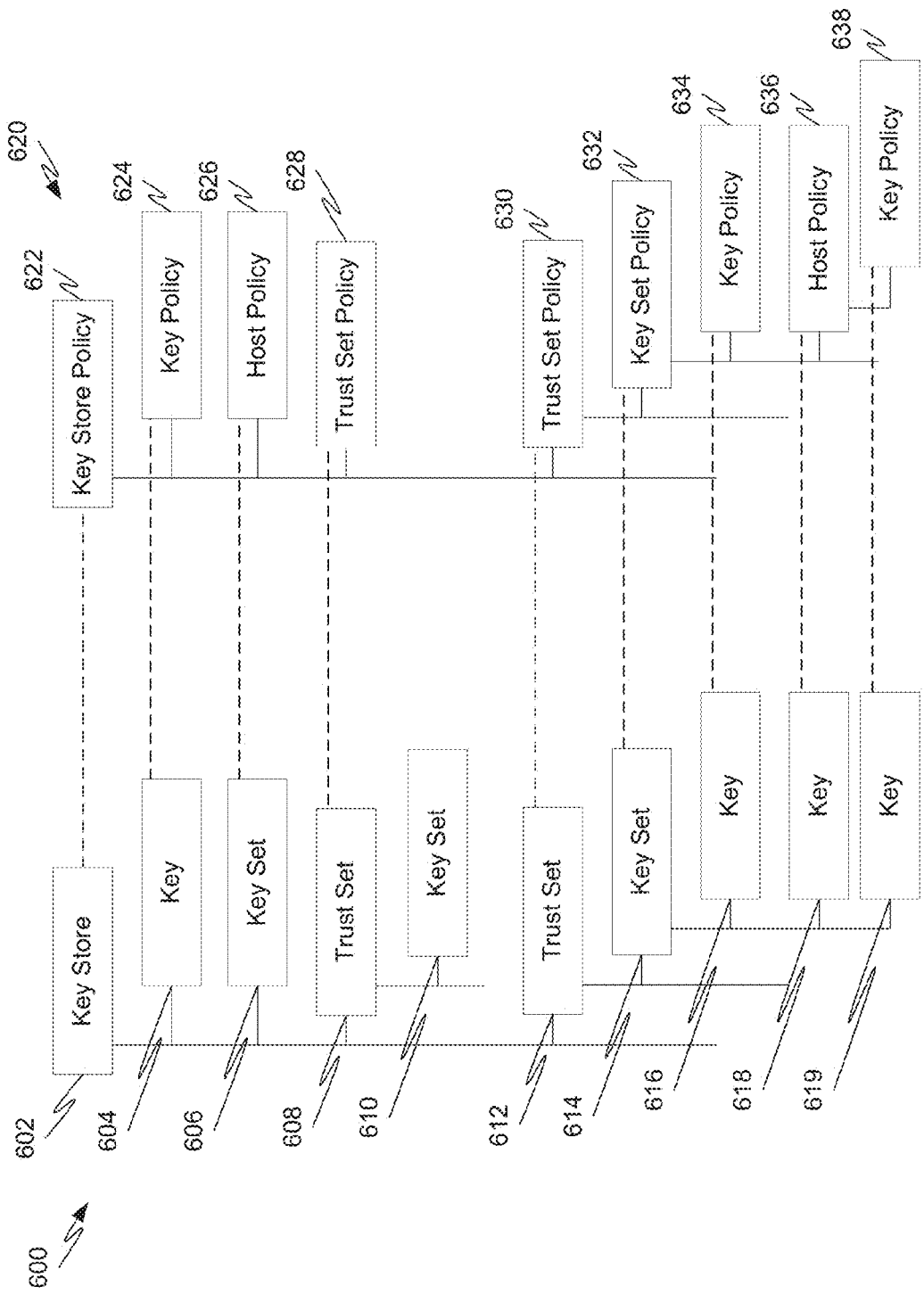
FIG. 6 illustrates a representative key store and policy store.

FIG. 6 illustrates a representative key store 602, shown generally as key hierarchy 600 and policy store 622, shown generally as policy hierarchy 620. These may represent, for example, information stored in key store 314/512 and policy store 316/514, respectively. Although the diagrams (FIGS. 3 and 5) and the hierarchies of FIG. 6 are shown as separate, they may be stored separately or together or combinations thereof. For example, the various policy objects may be stored separately and related to the various key objects or the policy objects may be stored as part of the various key objects (or vice versa) and/or some combination thereof.

Key store 600 may comprise a plurality of key objects 604, 616, 618, 619. The key objects 604, 616, 618, 619 represent the information stored about keys managed by various embodiments of a centralized key management system. Such a key object may comprise one or more of the following information:

(1) A key.
(2) Multiple keys.
(3) A key pair.
(4) Comments.
(5) Key options such as restrictions on which locations may access the key, restrictions on which users may access a key, an indication of which authentication methods are allowed, an indication of which protocol versions are allowed, an indication of compatibility, forced commands, and so forth.
(6) Location of key(s) (e.g., where to find them, system name, system IP address, like to the key(s) and so forth).
(7) Key user/holder (e.g., the person, or a service or an account accessing data at a server with the key and who holds the private key).
(8) Key requester/contact/owner (e.g., the person or entity who makes the request and decisions on who should have access to a system).
(9) KS approver (e.g., the person who is responsible for security on the system where the key will reside and/or be used)
(10) Key permissions (e.g., who may perform various operations with the key).
(11) Key type (e.g., user/service account private key, host private key, host public key, known host key, authorized key, other peoples key (e.g., keys external to an enterprise or location), and so forth).

As indicated in FIG. 6, one or more key objects may be grouped into a KS object 606, 610, 614. A KS object may include the name of the KS as well as other information such as an owner (e.g., a person who has the right to add/edit policies and otherwise manage the KS) and an approver (e.g., a person who has the right to approve or reject management operations and other actions/workflows for the KS).

Also as indicated in FIG. 6, one or more KS objects may be grouped into a TS object 608, 612. In the case of a KSI, such as a business partner's public key, it may be possible to have a key object directly grouped into a TS object, without being grouped into a KS object. A TS object may include the name of the TS as well as other information such as an owner (e.g., a person who has the right to add/edit policies and otherwise manage the TS) and an approver (e.g., a person who has the right to approve or reject management operations and other actions/workflows for the TS). As indicated above, a TS is one or more key sets that are grouped together for management purposes. Thus, a TS object 606, 610 groups together one or more KS objects 606, 610, 614 so they can be managed as a unit. To complete the object hierarchy, all key objects and TS objects may be grouped together under a key store object 602. A key store object may also have an owner and an approver as described above.

Although FIG. 6 represents key store 622 by an object hierarchy, database tables or some other mechanism may also be used to store the information and relationships.

Policy hierarchy 620 may comprise a plurality of policy objects 622, 624, 626, 628, 630, 632, 634, 636, and 638. The policy objects 622, 624, 626, 628, 630, 632, 634, 636, and 638 may apply at different levels in the key store hierarchy. Thus, key store policy object 622 may contain policy requirements that apply to all keys under management. Key policy object 624 may contain policy requirements that apply only to key object 604. Host policy object 626 applies to all keys in KS object 606. Host policy object 626 thus applies a host policy to all the keys in the KS represented by KS object 606. TS policy object 628 applies to keys represented by TS object 608.

The hierarchy headed by TS policy object shows variations in how policy objects may apply to key objects. TS policy object 630 applies to TS object 612. KS policy object 632 applies to keys represented by KS object 614. Key policy object 634 applies to key object 616. Host policy object 636 applies to key object 618. Key policy object 638 applies to the keys represented by key object 619.

As indicated, not all levels of the key store 602 need to have associated policy objects. If a policy object does not exist for a particular level, the policy for that level may inherit policy properties from higher-level objects. Thus, KS object 610 may inherit properties from TS policy object 628.

The policy hierarchy 620 may allow fully configurable nesting of the policy objects into logical and/or hierarchical groups by any key/KS/TS/policy/etc. object property, characteristic, user defined group, and so forth. As examples only, groupings may occur by geography, country, division, department, host type, host location, and so forth. In addition the system may allow tree structures within the above grouping such as by the state of management and/or how the objects are processed (e.g., such as by the various tasks and/or workflow that are associated with the objects). In all of these situations and the examples below, for instance, objects may be assigned granular access rights for viewing, reading, writing, and so forth to ensure that only approved individuals, systems, entities, etc. (such as object owner, administrator, approver, etc.) may be able to read, write, view, group, etc. the objects.

State of management may indicate a status for a particular key, KS, KSI, and so forth. For example, state of management may include Orphans (KSI that needs action), Suspects (KSI that urgently needs analysis to classify it), Whitelisted (identified good orphans, e.g., OPK), Blacklisted (identified bad suspects), Manageable (identified complete KS; may wait for TS allocation), Managed (KS brought under management), TS [name] (TS with manageable KS), TS [name2] (TS for division [name]), and so forth. As keys are initially located and then more information is gathered about them, they may logically progress through the management states such as orphans to suspects to whitelist/blacklist to manageable to managed to TS. In addition, flexible sub classifications can be assigned for better organizing policy objects under the policy tree. The indented tree below is a representative example.

```
Division Objects
    Managed [key type 1]
    My Objects
        Orphans
            Suspects
                [key type 1]
    and so forth.
```

How objects are processed and/or workflow associated with a policy object may be specified either as a list of tasks or by a name or other moniker that indicated the tasks and/or workflow that should be used with the associated key objects, KS, objects, TS objects, and so forth. Representative examples include Managed Objects (Hosts) with Owner, Objects (Hosts) without Owner, Objects (Hosts) needing full Approval workflow, Objects (Hosts) that Rotate in Group (Trust Set) with Trust Set (minimal) workflow, and so forth.

KSIs, KS, TS and other key related objects can be combined into these groups/subgroups matching the IT and/or organization structure, operational topology, hierarchy, and so forth as well as the state of the management, how operations are processed and other characteristics for better organizing the key environment under management. Combining into groups may be accomplished through a user interface, such as via drag/drop, copy/paste, move, specifying properties through drop down, text boxes, and so forth, or through scripts or other such mechanisms.

As a simple example, consider the following hierarchy, where the indention level represents a hierarchy level. In this hierarchy, sample object hierarchies like those shown in FIG. 6 are organized into various management categories and also by country. The term "hierarchy as in FIG. 6 (any combination)" is meant to illustrate that in the policy hierarchy below, any combination of elements such as those illustrated in FIG. 6 may reside in that location. Note that this is simply representative, since the "hierarchy as in FIG. 6 (any combination) may reside anywhere in such a hierarchy.

```
Policy Hierarchy
    Country: US
        Managed Objects
            Hierarchy as in FIG 6 (any combination)
        Unmanaged Objects
            Hierarchy as in FIG 6 (any combination)
    Country: FI
        Managed Objects
            Full Workflow
                FIG 6 (any combination)
            Trust Set workflow
                FIG 6 (any combination)
        Objects without Owner
            Hierarchy as in FIG 6 (any combination)
        Objects without Approver
            Hierarchy as in FIG 6 (any combination)
```

| Orphan Objects |
| Hierarchy as in FIG 6 (any combination) |
| ... and so forth. |

Where different levels of policy objects have conflicting requirements, resolution rules may be applied. Since a lower level object may inherit policy properties from higher-level objects, a simple resolution rule may be that lower level policy objects override higher-level policy objects (or vice versa). Lower level objects may have exclusions/exceptions that override higher-level properties if access control rights allow such and if the object is not locked as described below. There may also be resolution rules that do not allow one level of policy object to override another when it comes to certain fields or policy characteristics. For instance, an administrator may specify that all keys be generated using a particular algorithm and not allow any other object to override this requirement. Policies may be locked so that lower levels cannot alter the properties, preventing conflicts from arising at all.

Policy objects may comprise one or more of the following fields/properties. Each field/property may have a value and a restriction. Restrictions can be placed on a field/property either in terms of a blank field (e.g., not populated or no value) or in terms of a populated field. For example, key owner has no value and no restriction, key owner has no value and a restriction that it cannot contain a value, key owner has a value and no restriction on who/what can be assigned, key owner has a value and a restriction on who/what can be assigned, and so forth.

(1) Mathematical requirements for the key/key pair such as key length and algorithm used to generate the key.

(2) Format requirements for the key/key pair, which may be vendor specific (e.g., depend on the particular SSH variant used).

(3) Key file metadata requirements such as requirements for file permissions, key storage locations, access rights control/limitations, and so forth.

(4) Key options requirements such restrictions on which locations may access the key, restrictions on which users may access a key, an indication of which authentication methods are allowed, an indication of which protocol versions are allowed, an indication of compatibility, forced commands, and so forth.

(5) Key requester/contact/owner requirements (e.g., assignment of, or any restrictions on the requestor, contact and/or owner).

(6) Key approver requirements (e.g., assignment of, or any restrictions on the approver).

(7) Key permission requirements.

(8) Key expiry, requirements.

(9) Grace period.

(10) Action(s) to be taken at expiry, including actions to be taken when the grace period begins and ends. Actions to be taken may include a progression of actions such as send notification (warn), then escalate if certain conditions occur, then rotate/blacklist/whitelist and so forth.

(11) Indication whether the KS should be brought under management.

(12) Indication whether key rollback is allowed

(13) Requirements on key rollback periods.

(14) Requirements for key testing for rollback.

(15) Security level (e.g., a security rating such as high, medium, low which may involve other parameters such as key length, key expiry, and so forth).

(16) Security level restrictions (e.g., cannot connect from a low security to a high security, and so forth).

Additionally and/or alternatively, policy objects may contain restrictions on any of the various fields in the various key objects, KS objects, TS objects, or key store objects.

Although FIG. 6 represents policy store 622 by an object hierarchy 620, database tables or some other mechanism may also be used to store the information and relationships.

Embodiments disclosed herein may perform centralized management of keys through centralized policy enforcement. Policy enforcement may be accomplished through a combination of activities, such as key rotation, key generation, key policies, system configuration, and so forth. System configuration has already been discussed in conjunction with the flow diagrams and architectures above. However, system configuration may also be performed as part of centralized policy management. An example of this has previously been given. A more detailed discussion may be made with reference to FIG. 7, which illustrates a representative flow diagram 700 for performing actions triggered by policies.

The centralized key management system (such as 300 of FIG. 3 or 502 of FIG. 5) may detect out of policy conditions by examining policy information and comparing it to information known by the system. Comparison may be performed periodically as part of system operation (such as periodically examining key expiry information to detect keys that are about to expire/have expired) or may be triggered by a particular event (such as new information being received by the system from an agent or managed system). This may be performed, for example by analysis engines 308 or 506 or some other aspect of the centralized key management system. The process of examining policy information and comparing it to information known by the system to determine whether actions should be performed is indicated by operations 702 and 704.

Once the system has detected an out of policy condition, or a situation that may lead to an out of policy condition, various actions may be taken in accordance with the policy. Such policy conditions may be thought of as one or more if-then situations. If a particular condition or combination of conditions occurs, then take this action.

Figure 7:
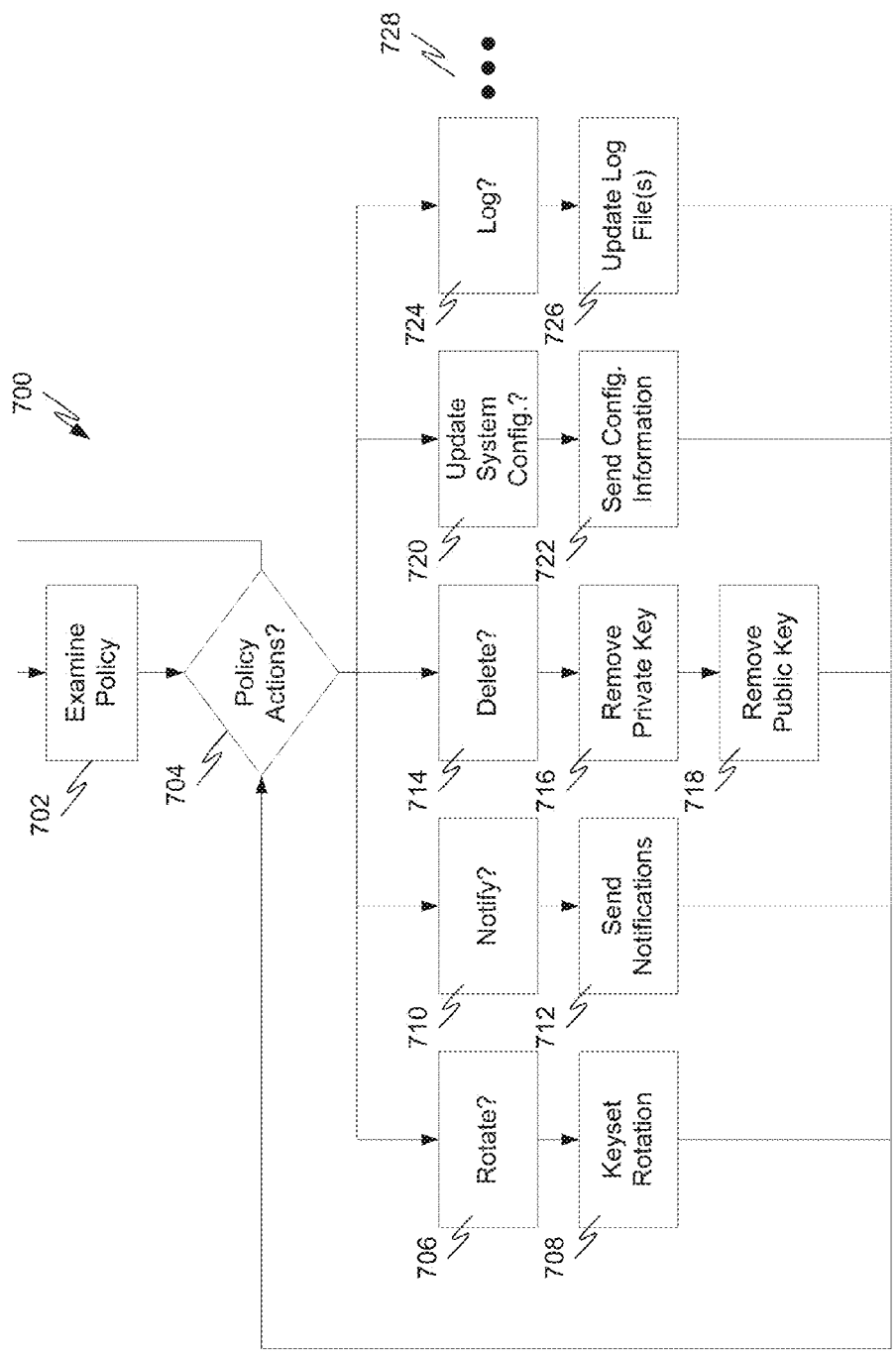
FIG. 7 illustrates a representative flow diagram for performing policy actions.

FIG. 7 illustrates representative actions that may be taken when a condition or combination of conditions occurs. If the identified action is to rotate the KS, then the action illustrated by operation 706 is taken. Operation 708 represents the actual key rotation. Key rotation may be accomplished, for example, by initiating a sequence of actions on the centralized key management system and/or by agents on managed systems. A representative example of key rotation is discussed below in conjunction with FIG. 8. As explained in examples below, key rotation may be implemented in various ways with all functions being executed together or with certain functions such as adding (e.g., prepending) public keys over some period of time, replacement of the private key at some other period of time, and even removal of old public keys at still other period of time.

The branch associated with a notification action is represented by operation 710 and the actual notification is indicated by operation 712. Sending notifications may be accomplished in a variety of mechanisms. For example, the centralized key management system may have a built-in notification system that will send notifications (or initiate other systems to send notifications) to various individuals/groups/systems using appropriate mechanisms. In general, lower priority notifications may be sent using channels that may not be attended on a constant basis, such as email. More urgent notifications may be sent using higher priority channels such as screen popup messages, text messaging, phone calls, and so forth. Notifications may have an escalating feature so that lower priority channels can be tried first and higher priority channels tried if the lower priority channels do not elicit the desired response. As another example, the centralized key management system may utilize other systems to send notifications and receive responses.

When the policy calls for key/KS deletion, the branch marked by operation 714 is taken. In general KS deletion may delete instances of a public and/or private key where they reside. In some cases all instances of a public and/or private key are deleted. In other cases only some instances of a public and/or private key are deleted. Thus, the operations of 716 and 718 may both be performed or only one or the other may be performed. The operations 716 and 718 may also be performed for all instances, or only certain instances. In addition, the operations may be performed in reverse order in some situations (e.g., the public key removed before the private key or vice versa).

Since removing a plurality of key set instances may not be an instantaneous occurrence, the system may present views to allow a user to decide how to remove public and private instances of a KS. Additionally, or alternatively, the system may perform these actions based on policy or other directions without presenting such a view to a user for decision The central management system may present key instances a particular KS that a user has UT relationship with and/or access to. Presenting the data in such a way may make it easy to remove unwanted key instances from one or more locations. Additionally, or alternatively, the system may remove key instances from particular location(s) based on policy without presenting information for display.

Similarly, the central management system may provide for a host centric view to assess the UT granted to access a particular host. If there are unauthorized or unwanted key instances (UT) these can be removed easily from a single view. Additionally, or alternatively, the system may remove key instances based on policy without presenting information for display.

Authorization and approval processes can be defined for proper control of these actions.

Removing a HT requires only to rotate the public key of the host. However, this would invalidate all access, and therefore may not be recommended in all instances.

Removing public and/or private keys may be accomplished in a variety of ways. With the architecture of FIG. 3, centralized key management system 300 may send a file operation assignment to the appropriate agents which may then remove the keys from the appropriate key files or replace the appropriate key files with substitute key files having the desired key removed. The embodiment of FIG. 5 may perform in similar fashion, by similarly tasking appropriate agents to remove keys using file operations or by using system plugins 518 to perform the same functions. As an alternative to file operations, systems may provide functionality to add, remove, or otherwise manage keys. Such functionality may also be invoked to remove the appropriate keys.

Policies may be enforced by updating or changing system configuration as previously discussed. These actions are illustrated in FIG. 7 by operation 720 and operation 722. As previously described, agents (in the case of the embodiments of FIG. 3 or FIG. 5) and/or the system directly (in the case of the embodiments of FIG. 5) may make configuration changes to systems to keep the systems in line with desired policies or configuration standards. Configuration changes may be performed using appropriate file/registry operations that update the appropriate system configurations. Such system configurations may involve the system itself (such as where permissions on files are set, modified, and so forth) or may be particular to SSH variations (such as where key or key information are stored, how key information is stored, which key options are available, how such options are set, modified and so forth), or some combination thereof.

Actions taken to enforce policies may be logged for analysis, evaluating, reporting and so forth. The logging path, marked by operation 724, illustrates the logging of any operation or set of operations for this purpose. Operation 726 indicates that the log file(s) are appropriately updated when this operation is selected.

In addition to the identified operations, other operations may be performed, as illustrated by ellipsis 728. Such operations may include blacklisting a key/KS, whitelisting a key/KS, no action, requesting other systems generate a key pair and forward the key pair, the public key and/or the private key to the centralized key management system, request/receive/act on authorization/approval for action(s), provisioning public and/or private keys on particular systems, key generation, and so forth. The illustrated actions of FIG. 7 are not intended to be an exhaustive list, but are representative in nature. Multiple actions may be performed simultaneously, or may be performed as a sequence of actions that depend on policy and/or other considerations (including which actions have been performed previously). Various combinations of actions may be performed in a variety of orders in this latter situation.

The actions described above may be scheduled at a point in the future instead of being executed immediately. In some sense this is shown by operation 702/704, which waits until conditions are met prior to taking actions. However, once a particular action is selected, the action may be initiated immediately or scheduled for some point in the future. Sometimes this means that the centralized key management system itself delays implementation of the function; sometimes this means that the centralized key management system uses its scheduling mechanisms (such as those discussed above) to schedule the action either for itself or for agent(s). Scheduling may occur based on time, an event, a combination of events, or any combination thereof.

One example may be actions taken when a key is about to expire. In this representative example, the policy specifies a key expiry date of September 30 with a grace period of 30 days. In this example, key rotation preparing actions may begin August 31. On that date, the centralized key management system may generate and send a sequence of notifications to appropriate individuals/systems as specified in the policy. The notifications may inform the recipient that the KS will soon expire and that the system will automatically rotate the KS at the end of the expiration period unless an administrator cancels the rotation or instructs the system to take other action. The centralized key management system may also generate the new key pair. Subject to approvals (if specified in the policy), the centralized key management system may start sending the new public key to authorized key locations during the grace period. At a later date, a reminder notification is sent. When the grace period has expired (i.e. at the key expiry date), the system ensures that all authorized key locations are reporting "green light" and the new private key may replace the existing (old) key effectively completing the key rotation. The system may send notification of successful KS rotation upon completion. Thus, in this example, the notification path identified by operation 710 is taken several times at different points. The path specified by operation 706 may be taken during the grace period only storing public keys on authorized key locations. Then upon expiration of the grace period, the path identified by operation 706 is taken to store the new private key (e.g., replace the old private key with the new private key) effectively completing rotation the KS. The log path taken by operation 724 may be taken either at each action or at the end to log the results of the appropriate action(s).

Another key expiration example may be as follows. In this example, the KS will be blacklisted unless authorization is given to rotate the KS instead of blacklisting it. When the initial expiry date is reached, notification of the needed approval and the consequences of no approval are sent. Reminders are sent at appropriate periods, perhaps with increasing escalation to other users/administrators/systems. Then, depending on whether the approval is received or not, the system will rotate the KS or blacklist the KS (remove it from the systems and, if desired, track the KS so it cannot be used again). This sequence of events takes the notification path identified by operation 710 at appropriate intervals with appropriate content, notification channels and recipients. Then, depending on whether the approval is received, takes the rotate path identified by operation 706 or the delete path identified by operation 714, and perhaps the log path of operation 724 to log the KS into the blacklist. The log path of operation 724 may also be taken at appropriate intervals to log what happens along the way or at the end to log results of the actions.

As another key expiration example, suppose a KS should only exist while a project is ongoing and the key should be removed at the end of the project. In this example, the policy state that the key expires at a particular date, or on the occurrence of a particular set of events (e.g., project completion). In this example, when the key expires, notifications may be sent (if specified by policy) using the path identified by operation 710 and the key set removed from the appropriate locations as specified by path 714. Different systems may remove the public/private keys in different orders. Similarly, although not specifically illustrated in FIG. 7, additional actions such as authorization/approval (indicated by ellipsis 728) may be used to control the timing or to ensure that the project is complete before key removal is taken. Thus, policies may be set to automatically execute all designated actions, policies may be set to execute actions unless overridden or canceled, policies may be set to receive authorization/approval at various levels or in various combinations before proceeding, and/or combinations thereof. All these options may be indicated by ellipsis 728.

In still another key expiration example, consider a situation where the key pair itself or a portion of a key pair is not being managed by the centralized key management system. In this situation, the centralized key management system may rely on another system for provisioning of the private portion of the key, for key generation, etc. and the centralized key management system may only deal with the public portion of the key. These public portions may be referred to as Other's Public Key (OPK). In the case where OPKs are tracked by the centralized key management system, the centralized key management system may also allow certain policies to be placed around the OPK and actions taken based on those policies.

When an OPK expires, the centralized key management system may send notification to appropriate individuals/systems using, for example, notification operations 710/712. The centralized key management system may also request the other system to generate a new key pair and request the OPK be sent to the centralized key management system using an appropriate request (e.g., ellipsis 728). The requests may include any specific key properties that should be used in generating the key. When the OPK is received, the OPK may be stored in the appropriate authorized key files on the appropriate systems (e.g., ellipsis 728).

In still a further example, the key pair may be managed by the centralized key management system, but the public key may need to be appropriately provisioned on a system not managed by the centralized key management system. In this case, upon expiration, the policy may require the system to generate a new key pair (e.g., ellipsis 728), appropriately provision or rotate the public and/or private key for systems that are managed (e.g., operation 706 and/or ellipses 728), and request that the new public portion be provisioned on the systems not managed by the centralized key management store (e.g., operation 710 and/or ellipses 728). The functions may also be coupled with appropriate authorizations/approvals (e.g., ellipsis 728).

Figure 8:
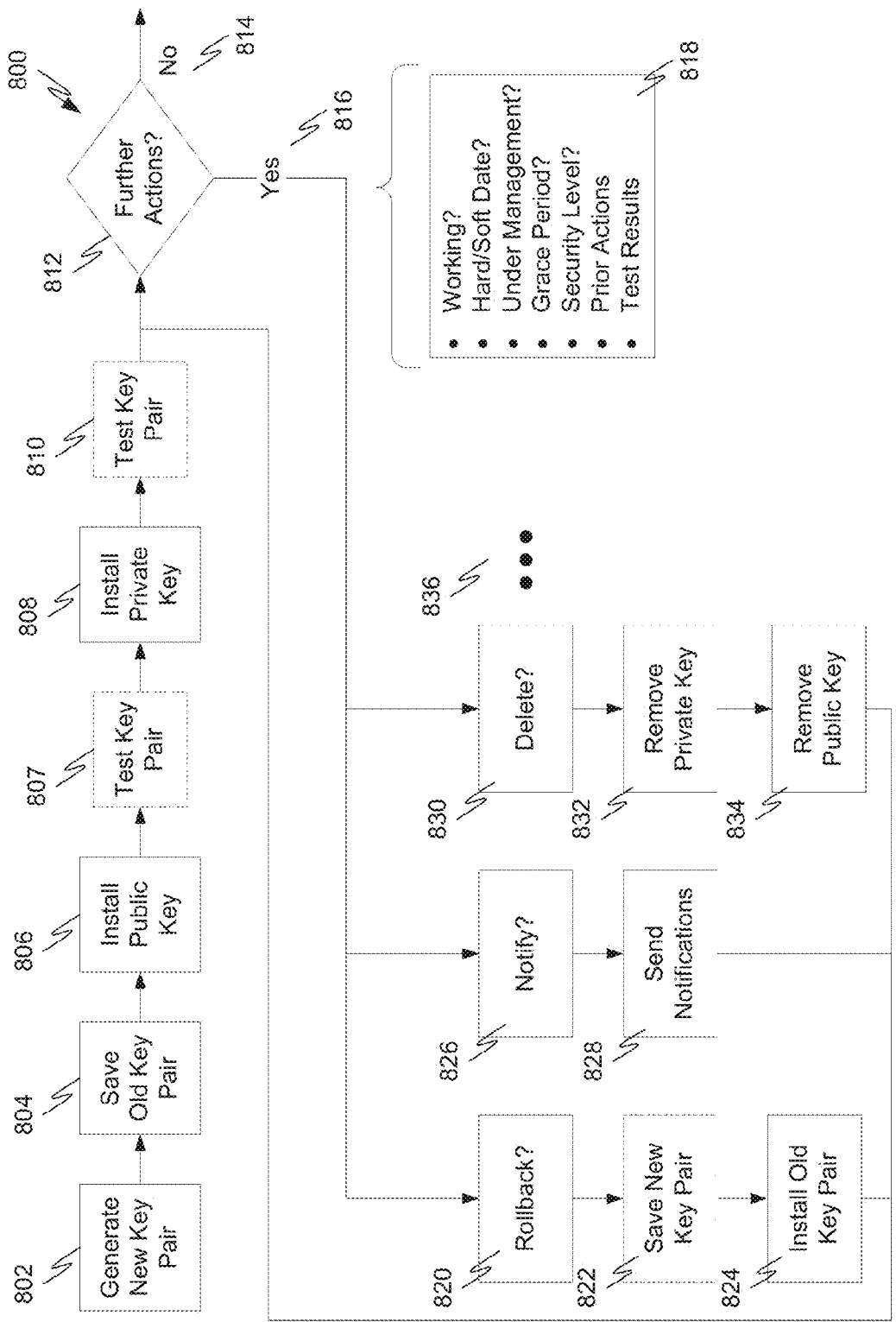
FIG. 8 illustrates a representative flow diagram for rotating keys with a rollback function.

FIG. 8 illustrates a representative flow diagram 800 for rotating keys with a rollback function. The flow diagram 800 may be implemented by a centralized key management systems like those illustrated in FIG. 3 and/or FIG. 5. The functions of the FIG. 8 may be performed by the centralized key management system or by agents, or by a combination thereof. In the discussion below, the operations are described as being performed by the centralized key management system, although it is understood that in some embodiments, the centralized key management system may instruct agents to perform some functions on behalf of the centralized key management system or agents may perform the actions themselves. Also, it should be understood that all functions may be performed at a single time, or that the process may be executed multiple times with some functions being performed on one execution and others being performed on another. Thus, not all functions need to be performed during all executions.

The flow diagram 800 begins in operation 802 where new key pairs are generated, ensuring that they adhere to proper policy. Many mechanisms may be used to generate appropriate key pairs. In one embodiment, the centralized key management system may generate the key pair. In another embodiment, the centralized key management system may utilize other system(s) to generate the key pair such as an external key generator. At the end of operation 802, the centralized key management has a new key pair that will be used to replace the old key pair.

In operation 804 the centralized key management system may save the old key pair if it isn't already saved. The key pair is kept for roll back purposes as explained below.

In operation 806 the public key is installed (e.g., provisioned). The public key may be provisioned at all locations where the prior "old" public key was provisioned, or changes may be made during provisioning of the public to add and/or delete locations where the new public key will be provisioned. At this point, the public key may be tested at some or all of the provisioned locations as shown by operation 807. This testing is described below. In operation 808, the private key is installed (e.g., provisioned). The private key, the corresponding key pairs, or both may also be tested in operation 810.

Key installation may be performed, for example, by scheduling appropriate file action(s) and/or appropriate configuration changes using the centralized key management system itself or via agent(s). Such a schedule may be based on time, an event, a combination of events, or any combination thereof. A new key may be installed for example by placing the key in the appropriate key file or by generating a new key file containing the new key and replacing the old key file with the new key file. Alternatively, systems often have functions that will add the key to the appropriate place when invoked.

These functions may also be used by the centralized key management system or via an agent. In one embodiment, the public key is installed by prepending the new public key to all relevant key instances (e.g., authorized keys). The private key may then be installed at the appropriate locations.

The public/private keys may be installed in either order, but one order may be better than the other. In general, installing by prepending the public keys prior to the public keys ensures that no SSH connectivity outage occurs as the old public key is still providing connections until the moment the old private key is replaced with the new private key. This is useful, for example, when a grace period is desired. Public keys may be provisioned during the grace period giving time to provision a number of public key instances in case of large and/or distributed environments. When installing keys, the public key may be installed in all locations where the old public key resided and the private key may be installed where the old private key resided.

Once the new keys are installed and appropriately configured, the keys may be tested as indicated in operation 807 and/or operation 810. Testing the keys may be performed by an agent, by the centralized key management system, or by some combination thereof. Keys may be tested in a variety of ways. In one embodiment, the system triggers use of the keys and watches to make sure no errors occur. If public keys have associated properties that may create errors in a testing environment such as forced commands, the test should account for these properties and/or errors. In one embodiment, the system configures the public key(s) for the test by removing any configuration options that may cause problems with the test, such as forced commands. After the keys are tested, the public keys may be reconfigured to the desired configuration (e.g., including forced commands). In another embodiment, the system may allow errors to occur and examine the errors to identify whether the errors that occurred are expected given the current configuration. In yet another embodiment, a specific SSH client may be provided for an agent to run. The SSH client may be configured so that its SSH connection capability is restricted to the authentication phase only, and that it drops/exits the connection before any key options such as forced commands are triggered. Using this approach would allow public keys with forced commands to be tested in an environment that would otherwise run unwanted production processes when a key is tested. Other ways to test the keys may also be used.

In operation 812 the system may determine whether to take further action. Determining whether to take further action can be based on a variety of information such as whether the new keys appear to be working (have any errors been detected), what actions have already taken place, whether notifications have been sent, whether responses have been received, and/or various policy parameters such as whether the keys were rotated during the grace period, whether the dates are hard/soft, whether the keys/systems are all under management by the centralized key management system, the security level of the key, and so forth. Such example considerations are illustrated in FIG. 8 in box 818.

To illustrate this with an example, perhaps the policy is designed to rotate the key in a way that allows the old key pair to be used if errors occur during testing after the new key pair is provisioned. Reverting to the old key pair is called "key rollback." Key rollback may have associated conditions, such as a time period within which rollback is allowed and/or a time period after which rollback is not allowed. This may be referred to as the key rollback period. In this example, once the new keys have been installed and tested, the system may not take any further action until the expiration of the key rollback period at which time the old keys are removed. In another example, the old keys may be removed as soon as the new keys are tested. Any combination of actions may be triggered by any sequence of time, events, policy parameters, and so forth.

If no further action is indicated (at least at this point), the "no" branch 814 may be taken and processing may proceed. If further action is indicated, then the "yes" branch 816 is taken and appropriate actions are taken.

If the keys appear to be working properly and the policy conditions have been met to remove the old keys, the delete path indicated by operation 830 may be taken. In this path, the private and public keys are removed as indicated by operations 832 and 834. Key removal has been previously discussed (e.g., in FIG. 7) and the same considerations may apply here as were discussed above. Thus, operations 830, 832, 834 may operate as discussed above in terms of order, conditions under which all operations are performed or only one or the other operation (832, 834) is performed, and so forth. Methods for key removal have also been discussed above and need not be repeated here. It is sufficient to note here that the centralized key management system may remove the keys itself or may remove them using agent(s) or some combination thereof.

The system may also be used to perform a key "split" where multiple valid private key instances are in operation and it is desired to split the key instances into different key sets. For example, suppose User A has identical private keys (from key pair A1) in both client 1 and client 2. Further suppose User A has UT to server hosts 3, 4, 5 and 6. It is decided to split the private keys. A new key pair (A2) is generated for use by User A from client 2. If User A wants UT toward servers 4 and 6, the A2 public key may be provisioned to authorized keys at hosts 4 and 6. The A2 private key may then provisioned to client 2. The A1 private key may then be removed from client 2 (as operation is through the A2 key pair). The A1 public keys may then be removed from servers 4 and 6. In this example, the order of key removal is not critical since User A always had legitimate UT to the hosts.

After the keys are removed, the centralized key management system may assess the need for further action. If no errors occur and everything functions appropriately, no further action may be needed and the "no" branch 814 may be taken. Alternatively, or additionally, the system may perform the notify function (branch marked by operation 826), and/or a log function (not shown) to log the results of the key rotation, and so forth.

If errors occur, the keys may be rolled back if allowed by the appropriate policy. Key rollback is indicated by the branch marked by operation 820. Key rollback means that the new keys are disabled and the old keys reinstated (e.g., re-provisioned). In this rollback function, the new key pair may be saved to be used once any issues are resolved as indicated in optional operation 822. Alternatively, a new key pair may be generated when any issues are resolved.

Operation 824 then reinstalls the old key pair. This entails installing the old private key in the locations where the old private key resided and, if the old private key is reinstated during the rollback period, there is no need for reinstating the public keys as they are still reside usable in the relevant locations. Only if rollback period has been passed, there is the need to install the old public key in the locations where the new public key resided.

How the old key pair is installed may depend on how the new key pair was installed. If the old key (public, private or key pair) was never removed, installing the old key may comprise making configuration changes so that the old key is used instead of the new key. If the old key no longer resides in a location, installation may call for copying the key to the appropriate location(s) and making appropriate configuration changes, if needed.

Although key rollback has been discussed as if either the old key pair or the new key pair are used exclusively, some embodiments may allow a combination to be used in appropriate circumstances. For example, if the new key pair functions everywhere but certain location(s), only those locations need to be rolled back and the locations where no errors occur can continue to function on the new key pair. Whether rollback is allowed and under what circumstances and to what extent may be specified in appropriate policies.

Operation 826 marks the notify branch where notifications are made as indicated by operation 828. Notification operations may function as previously described. The notification operation 826 may be used in a variety of ways. For example, if errors occur after key rotation, notification may be sent to an administrator and the administrator may be asked to approve key rollback prior to rollback occurring. As another example, the administrator may be given several options, such as deny rollback, approve rollback only for designated systems, approve rollback for all systems showing errors, and so forth.

Other operations, indicated by ellipses 836, may also be part of the system. For example, any of the actions discussed above may be part of the process.

Figure 9:
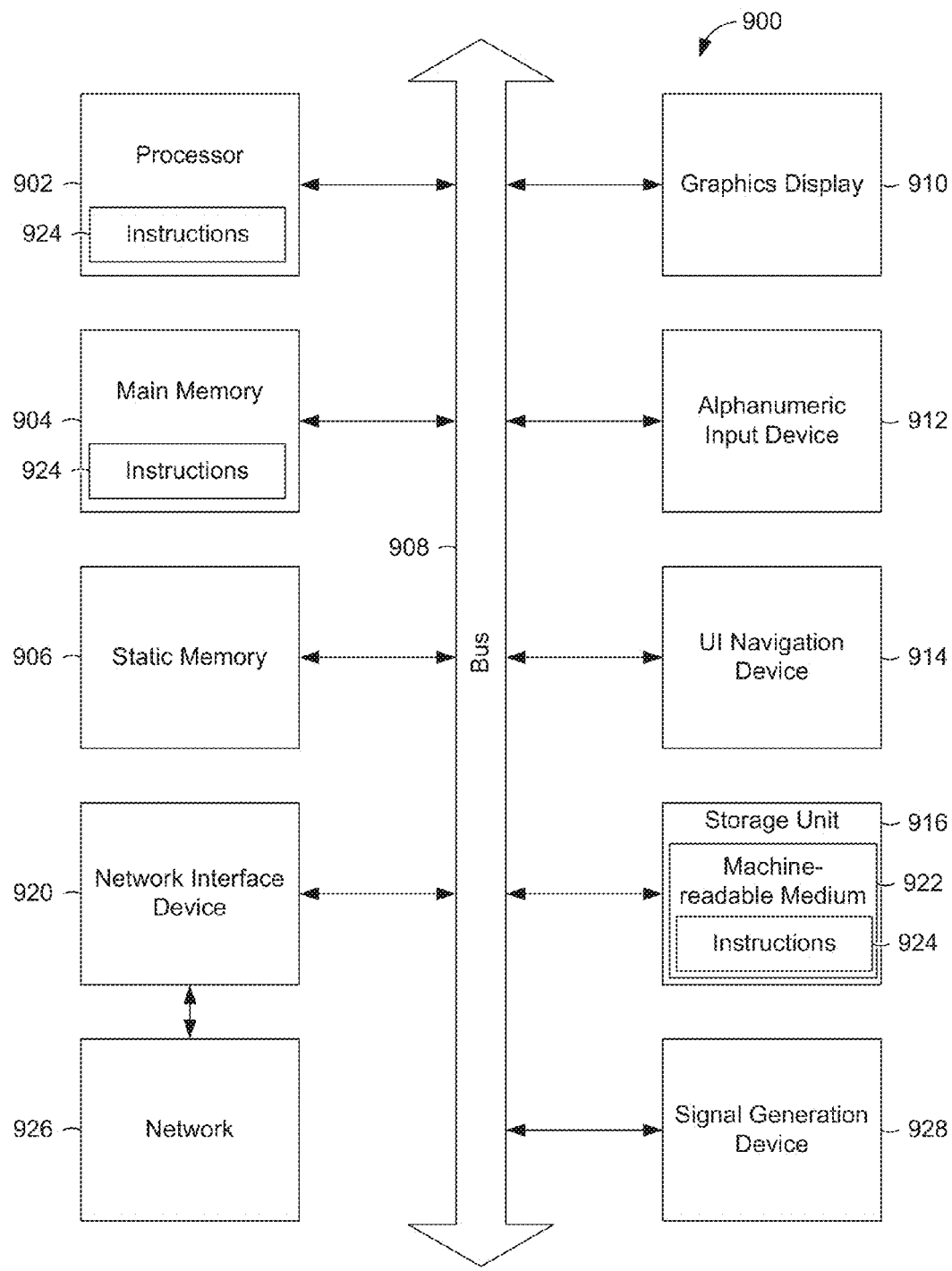
FIG. 9 is a block diagram of a computer processing system, within which a set of instructions for causing the computer to perform any of the methodologies of this disclosure, including centrally manage keys, agent functions, or other of the architectures and flow diagrams illustrated in the diagrams above and discussed herein.

FIG. 9 is a block diagram of a computer processing system 900, within which a set of instructions 924 for causing the computer to perform any one or more of the methodologies of this disclosure, including centrally manage keys, agent functions, or other of the architectures and flow diagrams illustrated in the diagrams above and discussed herein.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

In addition to being sold or licensed via traditional channels, embodiments may also, for example, be deployed by software-as-a-service (SaaS), application service provider (ASP), or utility computing providers. The computer may be a server computer, a personal computer (PC), a tablet PC, a set-top box (STB), a personal digital assistant (PDA), cellular telephone, or any processing device capable of executing a set of instructions 924 (sequential or otherwise) that specify actions to be taken by that device. Further, while only a single computer is illustrated, the term "computer" shall also be taken to include any collection of computers that individually or jointly execute a set (or multiple sets) of instructions 924 to perform any one or more of the methodologies discussed herein.

The example computer processing system 900 includes a processor 902 (e.g., a central processing unit (CPU), a graphics processing unit (GPU), advanced processing unit (APU) or some combination thereof), a main memory 904 and static memory 906, which may communicate with each other via a bus 908. The computer processing system 900 may further include a graphics display 910 (e.g., a plasma display, a liquid crystal display (LCD) or a cathode ray tube (CRT) or other display). The processing system 900 may also include an alphanumeric input device 912 (e.g., a keyboard), a user interface (UI) navigation device 914 (e.g., a mouse, touch screen, or the like), a storage unit 916, a signal generation device 928 (e.g., a speaker), and/or a network interface device 920.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer processing system 900, with the main memory 904 and the processor 902 also constituting computer-readable, tangible media.

The instructions 924 may be transmitted or received over a network 926 via a network interface device 920 utilizing any one of a number of well-known transfer protocols (e.g., HTTP).

While the machine-readable medium 922 is shown in an example embodiment to be a single medium, the term "machine-readable medium" may be taken to include a single medium or multiple media (e.g., a centralized or distributed database, and/or associated caches and servers) that store the one or more sets of instructions 924. The term "machine-readable medium" shall also be taken to include any medium that is capable of storing, encoding or carrying a set of instructions 924 for execution by the computer and that cause the computer to perform any one or more of the methodologies of the present application, or that is capable of storing, encoding or carrying data structures utilized by or associated with such a set of instructions 924. The term "machine-readable medium" shall accordingly be taken to include, but not be limited to, solid-state memories, and optical and magnetic media. The term "machine-readable storage medium" does not include signals or other transitory or intangible mechanisms. Such intangible media will be referred to as "machine-readable signal media." The term "machine-readable media" will encompass both "machine-readable storage media" and "machine-readable signal media."

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer readable medium" is used generally to refer to media embodied as non-transitory subject matter, such as main memory, secondary memory, removable storage, hard disks, flash memory, disk drive memory, CD-ROM and other forms of persistent memory. It may be noted that program storage devices, as may be used to describe storage devices containing executable computer code for operating various methods, may not be construed to cover transitory subject matter, such as carrier waves or signals. "Program storage devices" and "computer-readable medium" are terms used generally to refer to media such as main memory, secondary memory, removable storage disks, hard disk drives, and other tangible storage devices or components.

Plural instances may be provided for components, modules, operations, or structures described herein as a single instance. Finally, boundaries between various components, modules, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure, module, or component. Similarly, structures and functionality presented as a single module or component may be implemented as separate modules or components. These and other variations, modifications, additions, and improvements fall within the scope of the claims and their equivalents.

What is claimed is:

1. A method comprising:
   generating, via a processor of a computing device, a new key pair having a new public key and a new private key;
   retaining a copy of an old key pair having an old public key and and an old private key so the old public key and the old private key are not lost when the new private key and new public key are installed;
   installing the new public key at all locations where the old public key resides;
   installing the new private key at all locations where the old private key resides;
   testing the new key pair to identify whether the keys function properly; and
   responsive to detecting the keys are not functioning properly, performing key rollback by reinstalling the old private key and discontinuing use of the new private key.

2. The method of claim 1 further comprising refraining from performing key rollback when detecting the keys are not functioning properly falls outside a key rollback time period.

3. The method of claim 2 further comprising removing the old public key from locations where it resides after the key rollback time period.

4. The method of claim 1 further comprising removing the old public key from locations where it resides.

5. The method of claim 1 wherein testing the new key pair comprises testing the new public key after the new public key has been installed but before the new private key has been installed.

6. A method as in claim 5 wherein testing the new key pair comprises testing the new private key after the new private key has been installed.

7. A method as in claim 1 wherein testing the new key pair comprises testing the new public key and the new private key after the new private key has been installed.

8. A method as in claim 1 wherein testing the new key pair comprises configuring the new public key to remove any forced commands prior to testing and reconfiguring the new public key to restore any forced commands after the testing.

9. A system comprising:
   memory;
   a processor microprocessor coupled to the memory;
   executable instructions, that when executed on the processor, configure the system to at least:
   generate a new key pair having a new public key and a new private key;
   install the new public key at all locations where an old public key resides, the installation of the new public key comprising prepending the new public key to at least some instances of the old public key;
   install the new private key at all locations where an old private key resides;
   test the new key pair to identify whether the keys function properly; and
   detect a problem with the new public key, the new private key, or the new public key and the new private key, and, responsive to detecting a problem, reinstall the old private key resulting in key rollback.

10. The system of claim 9 wherein the executable instructions further configure the system to at least remove the old public key from locations where it resides after a key rollback time period when the test reveals that the new public key and the new private key are functioning properly.

11. The system of claim 9 further comprising removing the old public key from locations where it resides.

12. The system of claim 9 wherein the executable instructions further configure the system to at least test the new public key after the new public key has been installed but before the new private key has been installed.

13. The system of claim 9 wherein the executable instructions further configure the system to at least test the new private key after the new private key has been installed.

14. The system of claim 9 wherein the executable instructions further configure the system to at least test the new public key and the new private key after the new private key has been installed.

15. A machine-readable storage media containing executable instructions that, when executed, configure a system to at least:
   generate a new key pair having a new public key and a new private key;
   install the new public key at all locations where an old public key resides;
   install the new private key at all locations where an old private key resides;
   test the new key pair to identify whether the keys function properly;
   detect a problem with the new public key, the new private key, or the new public key and the new private key, and, responsive to detecting a problem, identifying whether the problem was detected within a key rollback time period; and
   responsive to the problem being detected within the key rollback time period, reinstall the old private key resulting in key rollback.

16. The machine-readable storage media of claim 15 wherein the executable instructions further configure the system to at least remove the old public key from locations where it resides after the key rollback time period when the test reveals that the new public key and the new private key are functioning properly.

17. The machine-readable storage media of claim 15 wherein the executable instructions further configure the system to at least test the new public key after the new public key has been installed but before the new private key has been installed.

18. The machine-readable storage media of claim 15 wherein the executable instructions further configure the system to at least test the new private key after the new private key has been installed.

19. A machine-readable storage media as in claim 15 wherein the executable instructions further configure the system to at least configuring the new public key to remove any forced commands prior to testing and reconfiguring the new public key to restore any forced commands after the testing.

20. A machine-readable storage media as in claim 15 wherein the executable instructions further configure the system to at least:
   identify an SSH client configured so that its SSH connection capability is restricted to the authentication phase only, so that it drops the connection before any key options are triggered; and test the new key pair against the identified SSH client.

* * * * *